United States Patent [19]

Sekimoto et al.

[11] Patent Number: 4,977,667
[45] Date of Patent: Dec. 18, 1990

[54] VEHICLE SUSPENSION ASSEMBLY SYSTEM

[75] Inventors: Isao Sekimoto; Shinichi Yasui, both of Hiroshima, Japan

[73] Assignee: Mazda Motor Corporation, Hiroshima, Japan

[21] Appl. No.: 386,253

[22] Filed: Jul. 28, 1989

[30] Foreign Application Priority Data

| Jul. 29, 1988 | [JP] | Japan | 63-190111 |
| Jul. 29, 1988 | [JP] | Japan | 63-190112 |
| Dec. 27, 1988 | [JP] | Japan | 63-330453 |

[51] Int. Cl.⁵ .............................................. B23P 21/00
[52] U.S. Cl. .................................... 29/784; 29/799; 29/824
[58] Field of Search ................ 29/784, 799, 822, 823, 29/824

[56] References Cited

U.S. PATENT DOCUMENTS

| 3,239,925 | 3/1966 | Piper | 29/784 X |
| 3,386,561 | 6/1968 | Spühl | 29/823 X |
| 3,393,439 | 7/1968 | Shriver | 29/823 |
| 3,588,993 | 6/1971 | Turner | 29/823 X |
| 3,967,363 | 7/1976 | Meyer | 29/434 |
| 3,999,274 | 12/1976 | Butler | 29/243.54 |
| 4,106,175 | 8/1978 | Meyer | 29/243.56 X |
| 4,392,293 | 7/1983 | Yamaguchi et al. | 29/235 X |
| 4,785,519 | 11/1988 | Krueger | 29/227 |

FOREIGN PATENT DOCUMENTS 62-46507 7/1987 Japan.
63-21532 8/1988 Japan.

Primary Examiner—Mark Rosenbaum
Assistant Examiner—Frances Chin
Attorney, Agent, or Firm—Sixbey, Friedman, Leedom & Ferguson

[57] ABSTRACT

A vehicle suspension having a shock absorber and a coil spring is assembled while the parts of the suspension such as the shock absorber and the coil spring are placed on a pallet and conveyed by a conveyor line. The pallet is provided with a shock absorber holding mechanism which holds the shock absorber in an upstanding state, compressing claws which are engaged with an upper end portion of a coil spring and a feed mechanism which moves up and down the compressing claws and holds it in a desired position. The conveyor line is provided with a driving mechanism which drives the feed mechanism.

13 Claims, 37 Drawing Sheets

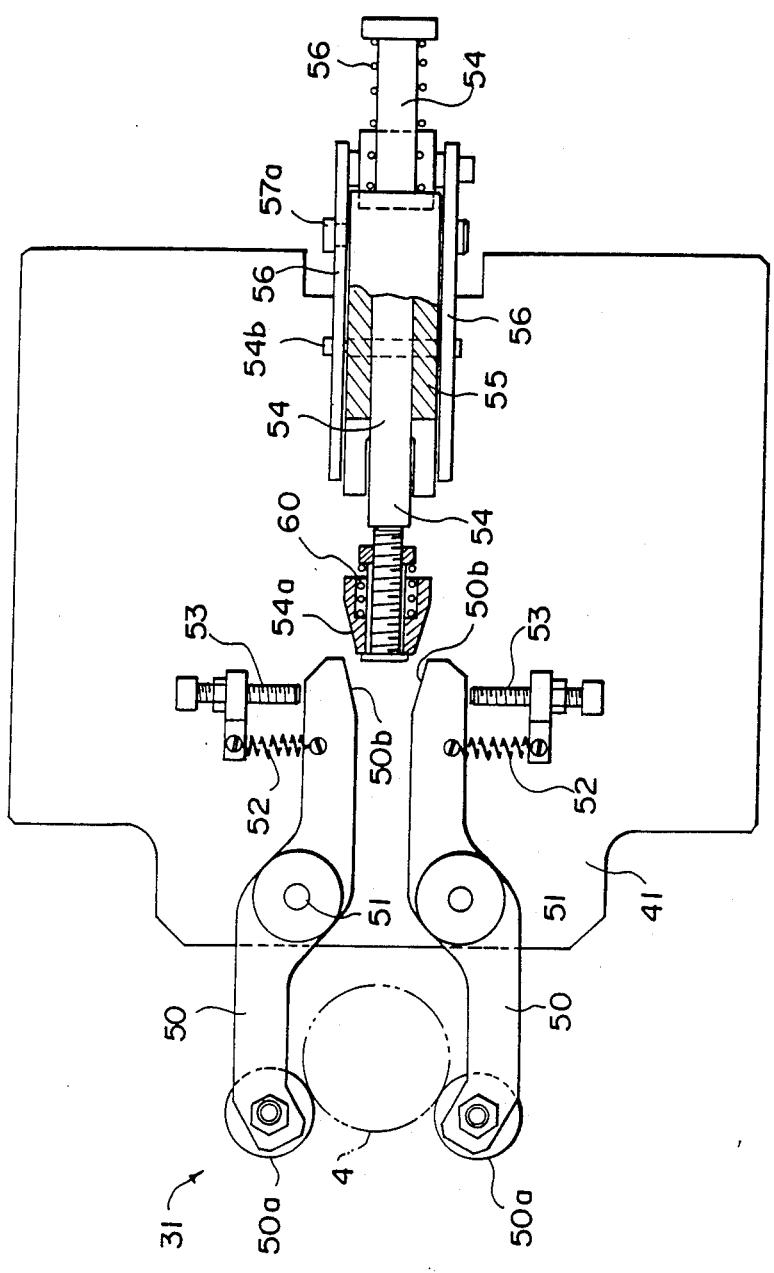

F I G .18
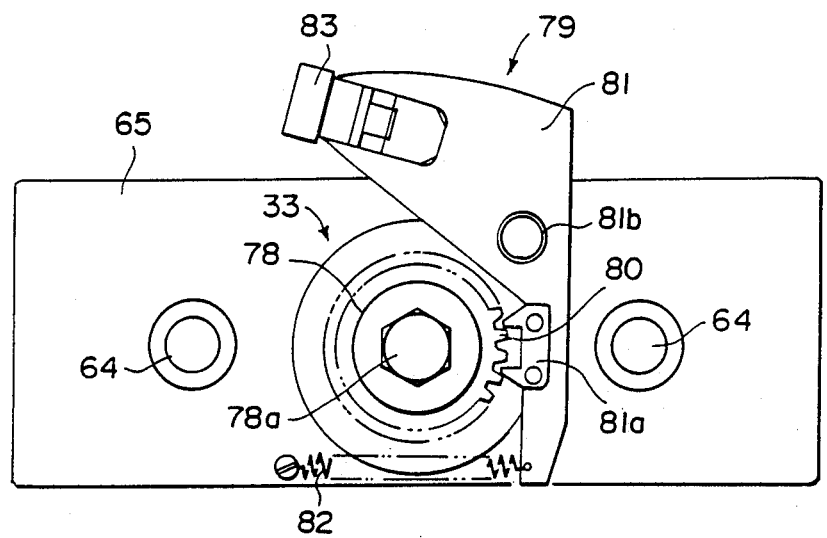
F I G .19
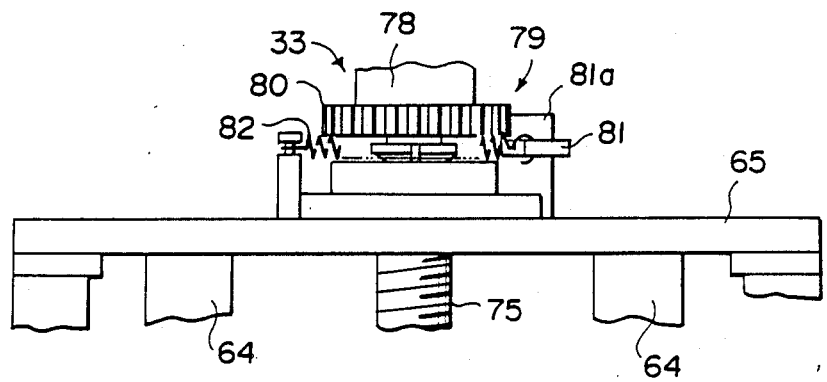

F I G. 43
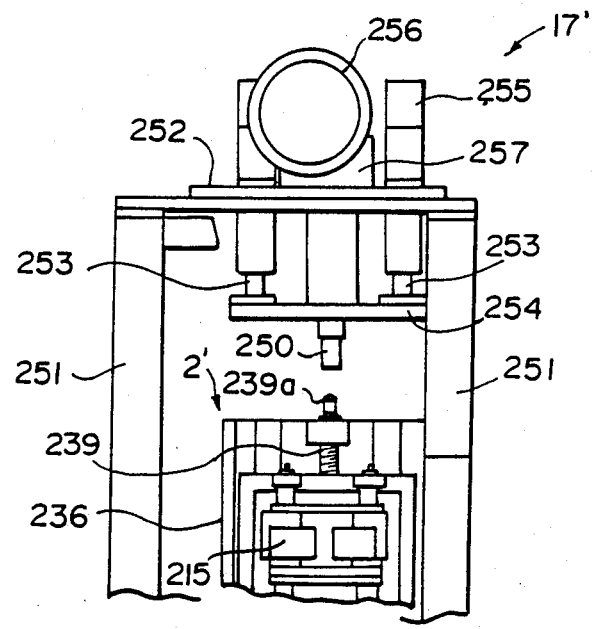

4,977,667

VEHICLE SUSPENSION ASSEMBLY SYSTEM

BACKGROUND OF THE INVENTION

1. Field of the Invention

This invention relates to a suspension assembly system for assembling a suspension for a vehicle.

2. Description of the Prior Art

When a suspension is assembled, a coil spring must be incorporated with a shock absorber in a compressed state. In Japanese Utility Model Publication No. 62(1988)-46507, there is disclosed a system in which all the steps of assembling the suspension are effected by an exclusive mechanism at a single station. However, this system is disadvantageous in that the operating time at the station where the suspension assembling mechanism is provided is too long as compared with the operating time at the other stations and accordingly, the idle time at the other stations is extended, whereby the working efficiency of the overall system deteriorates.

In order to line-assemble the suspension, the coil spring and the shock absorber must be placed on a pallet and conveyed from station to station. However, when a driving mechanism which compresses the coil spring and holds it in the compressed state is provided on each pallet, the manufacturing cost is increased and the overall size of the pallet is enlarged.

SUMMARY OF THE INVENTION

In view of the foregoing observations and description, the primary object of the present invention is to provide a vehicle suspension assembly system which enables line assembly of the suspension without provision of the driving mechanism on the pallet The vehicle suspension assembly system of the present invention is characterized in that the pallet which is conveyed by a conveyor line is provided with a shock absorber holding mechanism which holds a shock absorber in an upstanding state, a compressing claw means which is engaged with an upper end portion of a coil spring and a feed mechanism which moves up and down the compressing claw means and holds it in a desired position, and the conveyor line is provided with a driving mechanism which drives the feed mechanism.

BRIEF DESCRIPTION OF THE DRAWINGS

FIG. 13 is a plan view of the shock absorber FIG. 18 is a plan view of the revolution lock mechanism, FIG. 19 is a front view of the revolution lock mechanism, FIG. 43 is a front view showing a part of the driving mechanism.

DESCRIPTION OF THE PREFERRED EMBODIMENT

Figure 1:
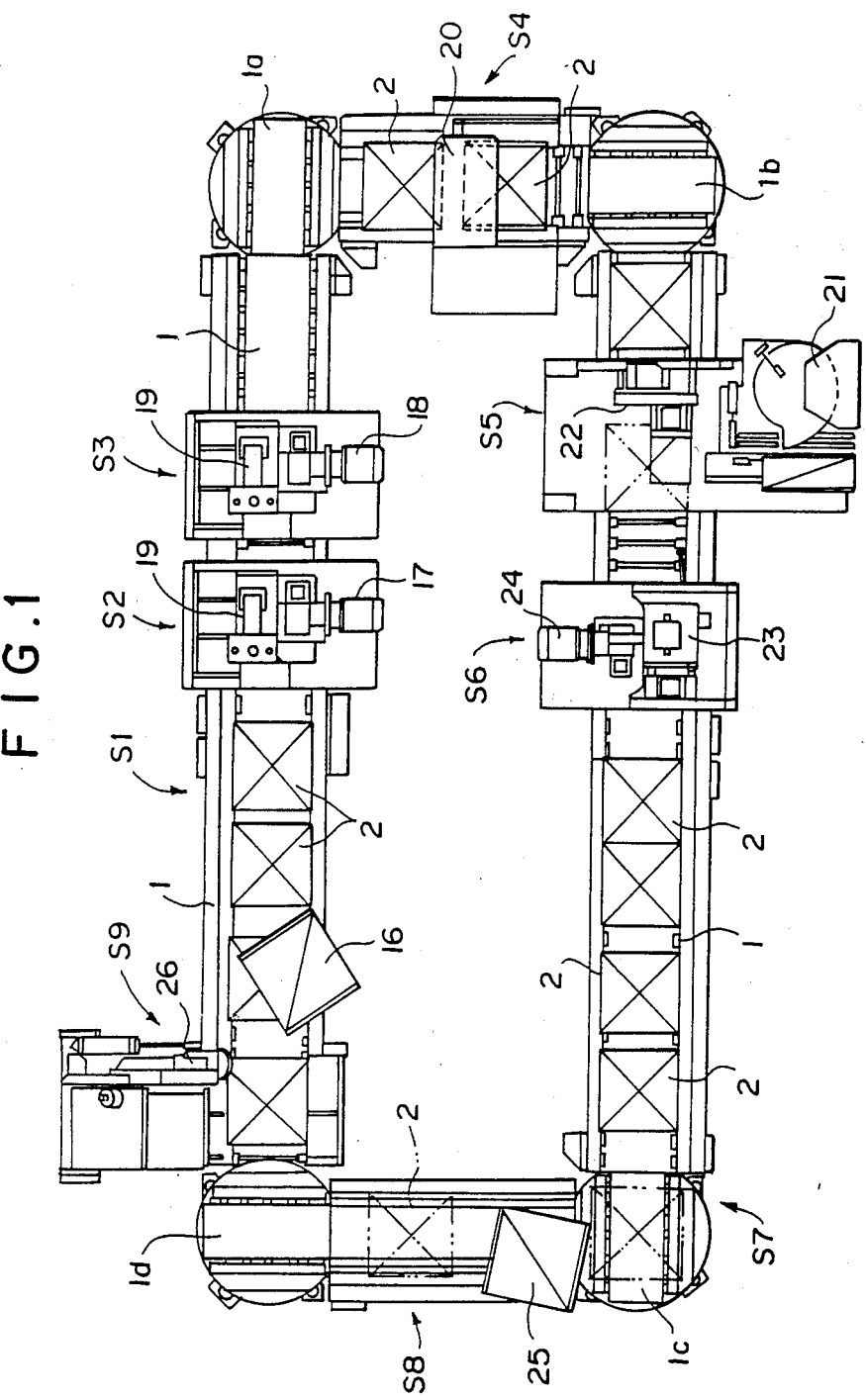
FIG. 1 is a schematic plan view of a suspension assembly system in accordance with an embodiment of the present invention.
Figure 2:
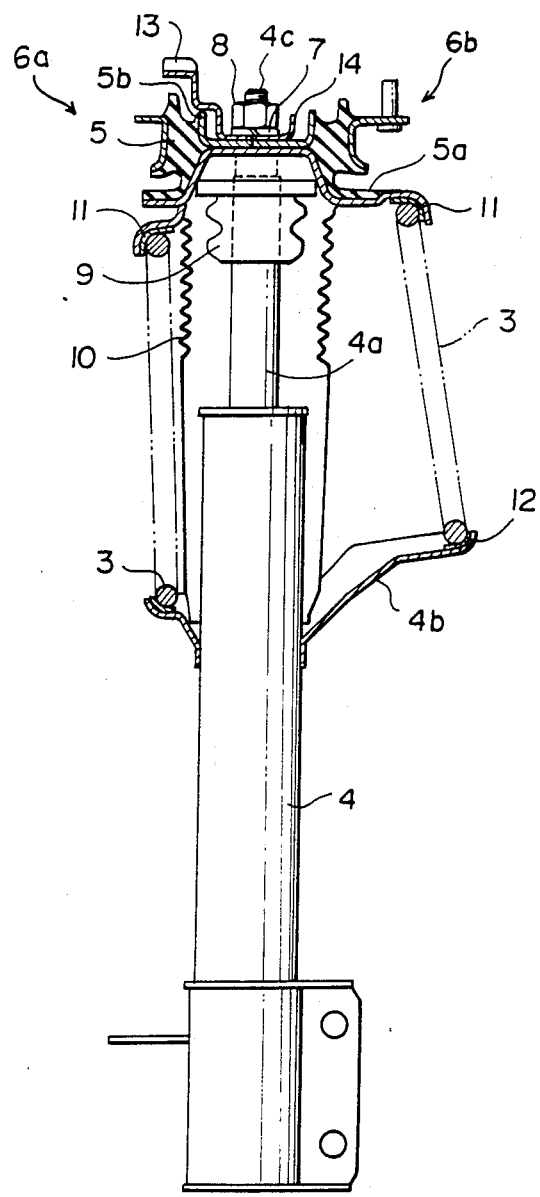
FIG. 2 is a front view partly in cross-section of an assembled suspension.
Figure 3:
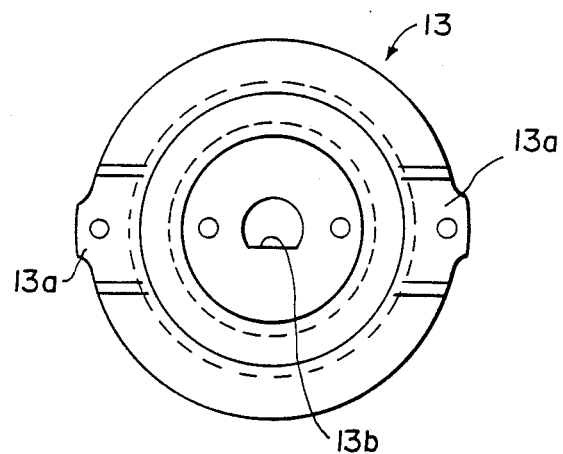
FIG. 3 is a plan view of an actuator casing.
Figure 4:
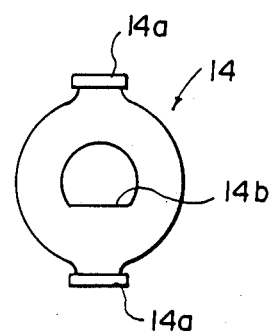
FIG. 4 is a plan view of a set plate.

In FIG. 1, a suspension assembly line in accordance with an embodiment of the present invention is for assembling first and second suspensions 6a and 6b shown in FIG. 2 (The first and second suspensions are basically the same in structure, and the left upper half of FIG. 2 shows the first suspension 6a and the right upper of FIG. 2 shows the second suspension 6b), and comprises a loop-like conveyor line 1 which is provided with first to fourth turn tables 1a to 1d at four corners thereof First to ninth stations S1 to S9 are disposed along the conveyor line 1. As shown in FIG. 2, the suspension 6 (either of the first and second suspensions 6a and 6b) includes a shock absorber 4 which has a rod a. A lower spring retainer 4b fixed to an upper portion of the shock absorber 4 and a mount rubber 5 is mounted on the upper end of the rod 4a. The mount rubber 5 has a lower surface which defines an upper spring retainer 5a and an upper surface which defines an upper seat 5b. The mount rubber 5 is fixed to the rod 4a by a nut 8 which is screwed on a threaded upper end portion 4c of the rod 4a over a washer 7. A bump stopper 9 is fitted on the rod 4a and a dust boot 10 covers the upper end portion of the cylinder body of the shock absorber 4 and the rod 4a thereof. A coil spring 3 is held between the upper spring retainer 5a and the lower spring retainer 4b in a compressed state with spring seats 11 and 12 interposed between the coil spring 3 and the respective spring retainers 5a and 4b. In the first suspension 6a, an actuator casing 13 shown in FIG. 3 is mounted on the mount rubber 5, and in the second suspension 6b, a set plate 14 shown in FIG. 4 is mounted on the mount rubber 5.

At the first station S1, the shock absorber 4 for a type of vehicle indicated by an indicator 16 is placed on a pallet 2 (shown in FIG. 5) in an assembling position at the center of the pallet 2, and the lower spring seat 12, the coil spring 3, the bump stopper 9, the dust boot 10, the upper spring seat 11 and the mount rubber 5 are positioned with respect to the shock absorber 4. Thereafter, the compressing claws 32 (to be described in detail later) are closed to hold the upper end portion of the mount rubber 5, and the lower end of a lifting rod 15 is screwed on the upper end portion of the rod 4a, thereby causing the shock absorber 4 to stand vertical. Further, the actuator casing 13 or the set plate 14 is placed on a temporary support jig 73.

Compression driving mechanisms 17 and 18 are respectively disposed at the second and third stations S2 and S3. The compression driving mechanisms 17 and 18 actuate a feed mechanism 33 of the pallet 2 and compresses the coil spring 3 of the suspension 6. The compression driving mechanisms 17 and 18 further hold the coil spring 3 in the compressed state, and the lifting mechanisms 19 which are respectively provided on the compression driving mechanisms 17 and 18 lift the rod 4a of the shock absorber 4 upward by way of the lifting rod 15, thereby extending the rod 4a. Each lifting mechanism 19 removes the lifting rod 15 from the rod 4a after the rod 4a is held not to contract and then houses the lifting rod 15 in a predetermined position. Then the pallet 2 is turned and conveyed to the fourth station S4. At the fourth station S4, a transfer mechanism 20 transfers the actuator casing 13 or the set plate 14 on the temporary support jig 73 to the upper end of the rod 4a. Thereafter, the pallet 2 is turned and conveyed to the fifth station S5.

At the fifth station S5, a feed mechanism 21 fits the washer 7 on the upper end portion of the rod 4a and brings the nut 8 into engagement with the upper end portion. Thereafter, a temporary tightening mechanism 22 temporarily tightens the nut 8. Then the pallet 2 is conveyed to the sixth station S6, where a regular tightening mechanism 23 tightens the nut 8 with a predetermined torque. After the regular tightening, the rod 4a is released and the is allowed to contract. At the same time, a release driving mechanism 24 drives the feed mechanism 33 in the reverse direction so that the coil spring 3 is released.

Then the pallet 2 is conveyed to the seventh station S7. At the seventh station S7, the coil spring 3 suitable for the suspension 6 which is to be assembled next and is indicated by an indicator 25 is placed on a temporary spring support jig 61. Thereafter, the suspension 6 which has been assembled is delivered to a suitable means at the eighth station S8. Then the pallet 2 is returned to the first station S1 via the ninth station S9. At the ninth station S9, a spring load measuring device 26 compresses, by a predetermined amount, the coil spring 3 held by the temporary spring support jig 61 and measures the counterforce of the coil spring 3, thereby checking whether a correct coil spring 3 has been placed on the pallet 2.

Figure 5:
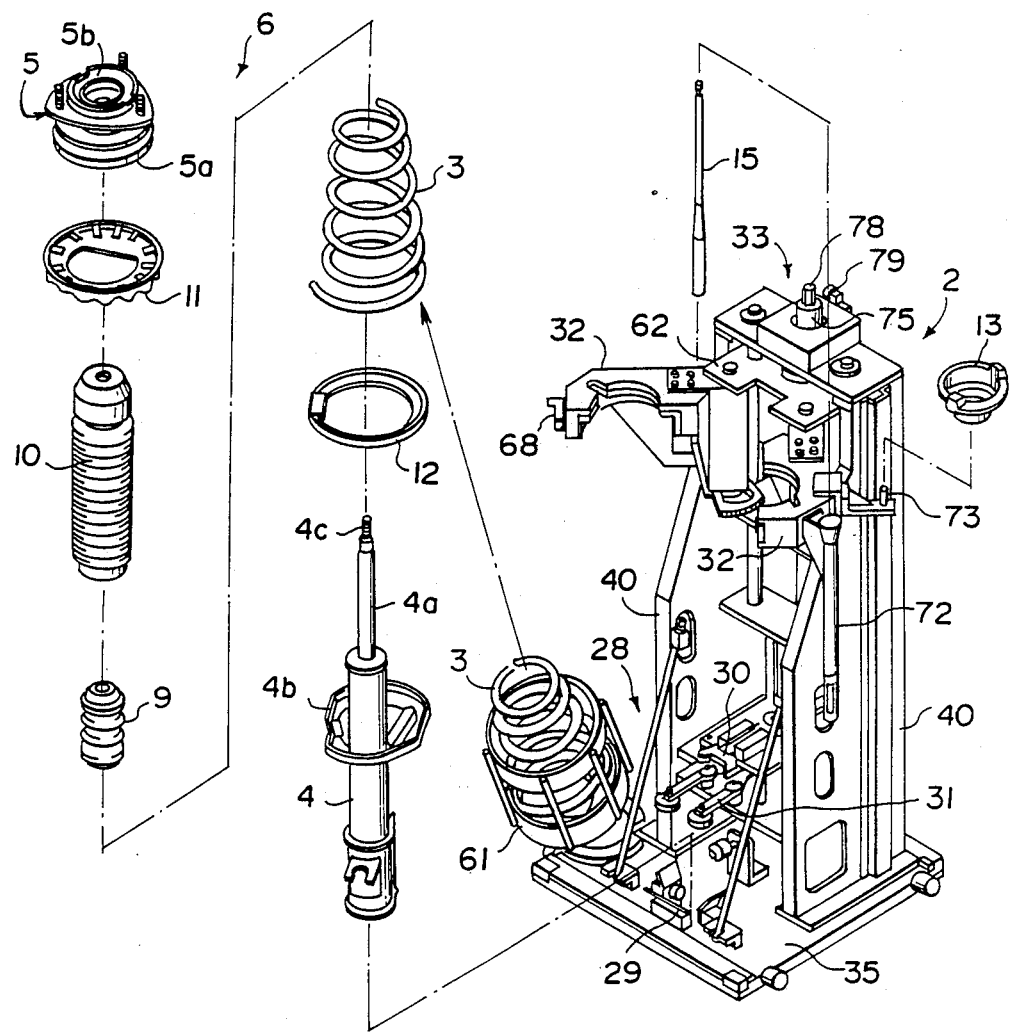
FIG. 5 is a perspective view showing the pallet together with the parts of the shock absorber at the first station.
Figure 6:
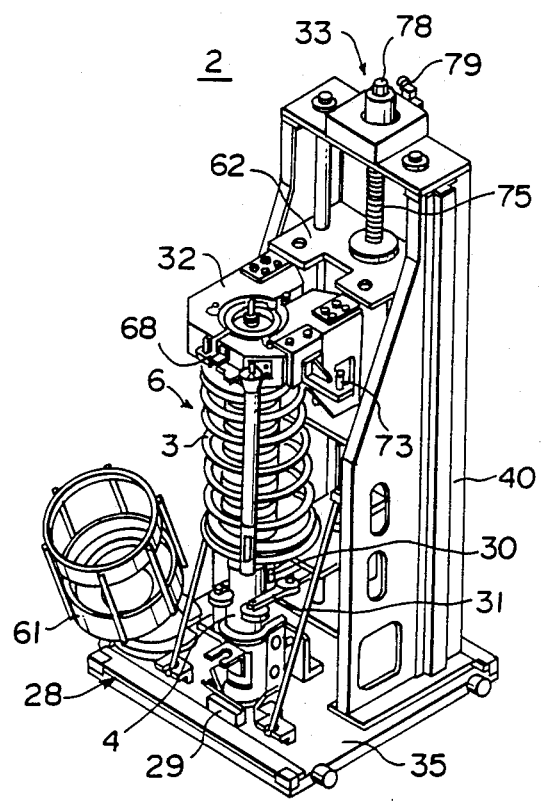
FIG. 6 is a perspective view showing the pallet after the parts of the shock absorber are set on the pallet at the first station.
Figure 7:
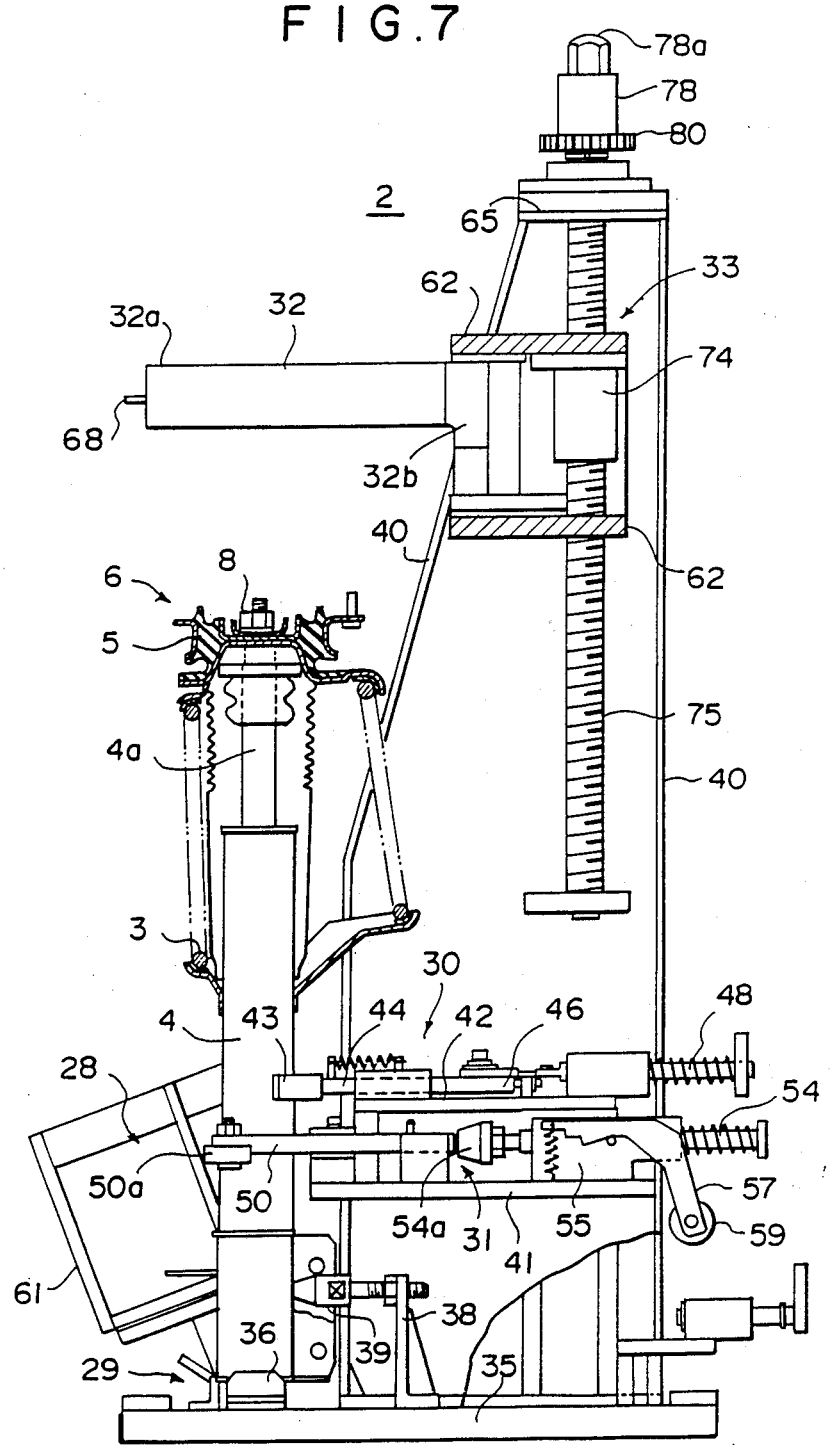
FIG. 7 is a front view partly in cross-section of the pallet.
Figure 8:
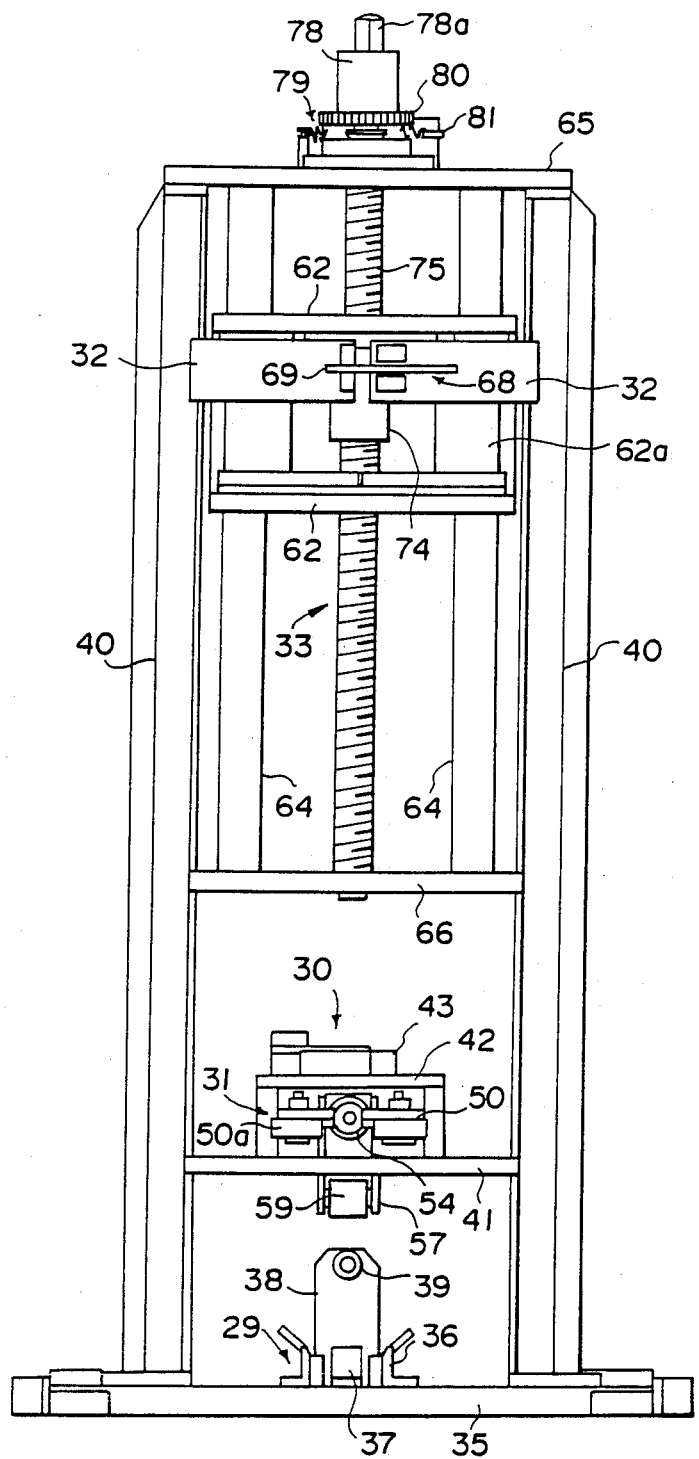
FIG. 8 is a front view showing a part of the pallet.
Figure 9:
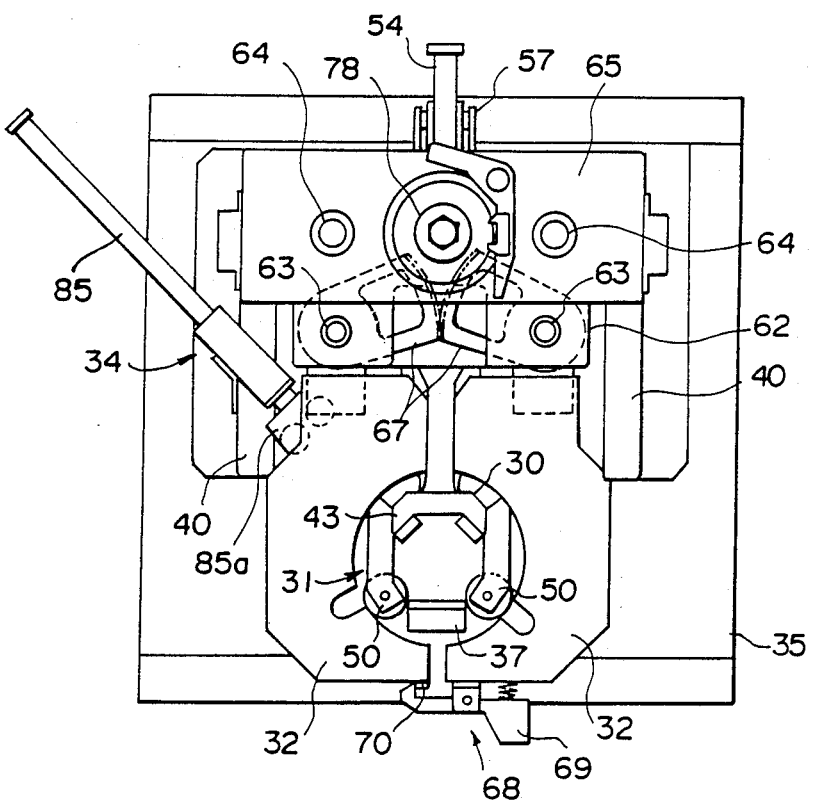
FIG. 9 is a plan view of the pallet.
Figure 10:
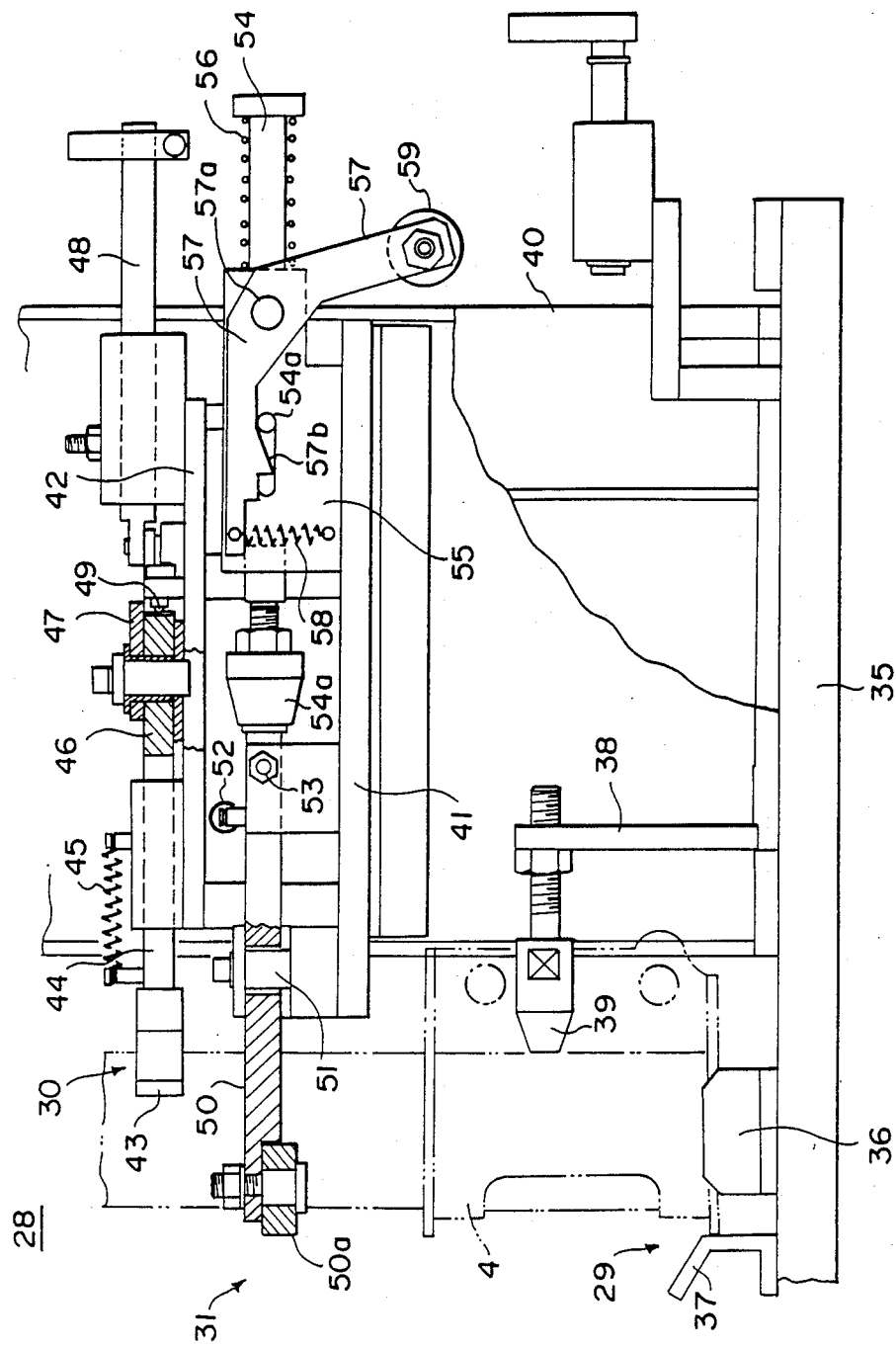
FIG. 10 is a side view partly in cross-section of the shock absorber holder.
Figure 11:
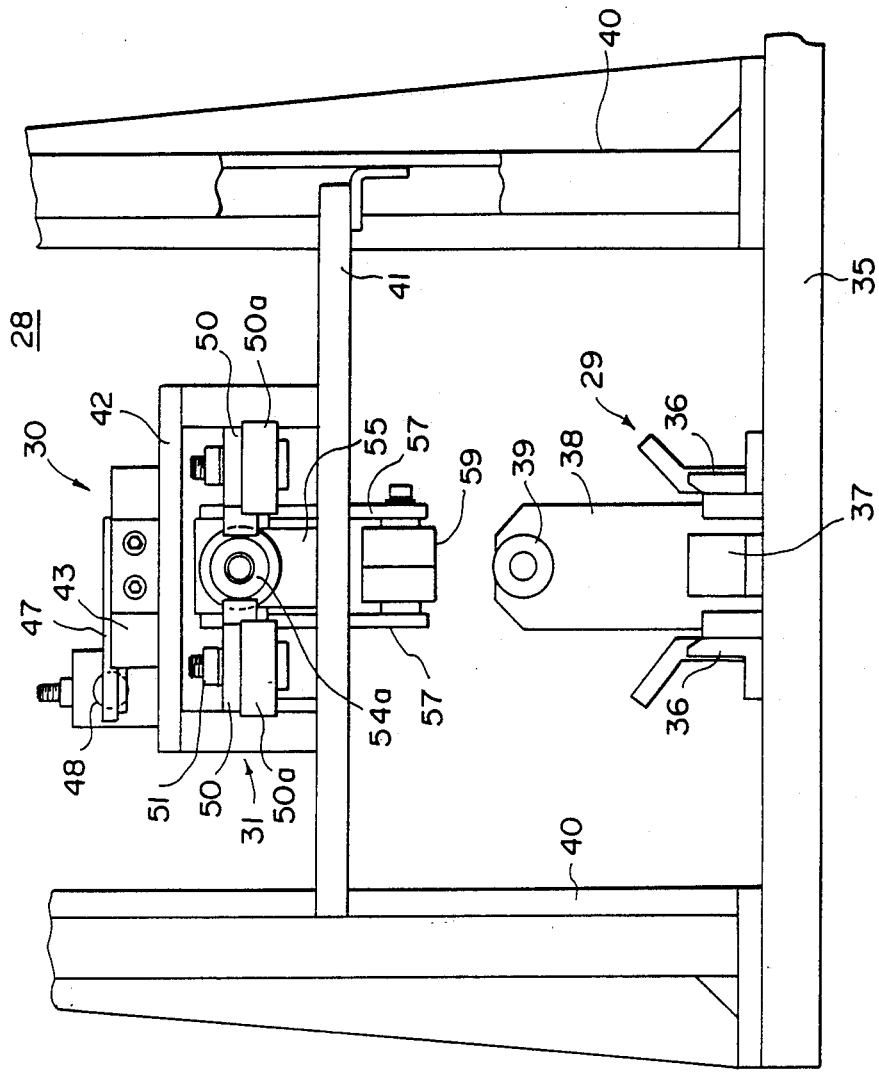
FIG. 11 is a front view of the holder.

The state of the pallet 2 at the first station S1 is shown in FIG. 5, and the state of the pallet 2 at the fifth station S5 is shown in FIG. 6. The pallet 2 which is conveyed along the conveyor line 1 comprises a shock absorber holder 28 which holds the shock absorber 4 upstanding, a shock absorber clamp 31 which holds the shock absorber 4 from the front side, said compressing claws 32 which are engaged with the mount rubber 5 on the end of the rod 4a, said feed mechanism 33 which moves up and down the compressing claws 32 and can stop them in a desired position, and a rod retainer mechanism 34 which retains the extended rod 4a so that it cannot move downward. The shock absorber holder 28 comprises a lower end support 29 which supports the lower end of the shock absorber 4 and a stationary support 30 which holds an intermediate portion of the shock absorber 4. As shown in FIGS. 10 and 11, the pallet 2 has a base plate 35 and the lower end support 29 comprises a pair of lateral positioning members 36, a front positioning member 37 and a rear positioning pin 39. The lateral positioning members 36 are fixed to the base plate 35 and are opposed to each other on the left and right side of the front positioning member 37. The inner side of the upper part of each lateral positioning member 36 abuts against the lower end of the shock absorber 4 and determines the lateral position of the shock absorber 4. The rear position pin 39 is supported by a bracket 38 which is fixed to the base plate 35. The front positioning member 37 and the rear positioning pin 39 associate in positioning the shock absorber 4 back and forth. Thus the shock absorber holder 28 determines the center of the lower end of the shock absorber 4 and the level of the same.

The stationary support 30 is mounted on a mounting plate 42 which is mounted above a support plate 41 in parallel therewith. The support plate 41 extends horizontally and is supported by a pair of vertical frames 40 which are fixed to the base plate 35 laterally spaced from each other. The stationary support 30 has a V-shaped receiving member 43 (See also FIG. 12) which abuts against the rear side of an intermediate portion of the shock absorber 4. The receiving member 43 is connected to a slide rod 44 which is slidable back and forth and urged rearward by a spring 45. The position of the receiving member 43 is determined by abutment of the rear end of the slide rod 44 and a cam disk 46 disposed behind the slide rod 44. A lever 47 is pivoted on the cam disk 46 at one end and an operational rod 48 is connected to the other end of the lever 47 and extends rearward. The operation rod 48 is moved between a forward position and a rearward position. When the operation rod 48 is moved back and forth, the cam disk 46 is rotated so that when the operational rod 48 is in the rearward position, a first cam portion 46a on the cam disk 46 abuts against the rear end of the slide rod 44, and when the operational rod 48 is in the forward position, a second cam portion 46b abuts against the rear end of the slide rod 44. The first and second cam portions 46a and 46b differ from each other in height. That is, the position of the receiving member 43 can be changed according to the diameter of the shock absorber 4. The cam disk 46 is provided with a pair of notches 46c which are engaged with a pin 49 to lock the cam disk 46 in the respective positions corresponding to the forward position and the rearward position of the operational rod 48.

Figure 34:
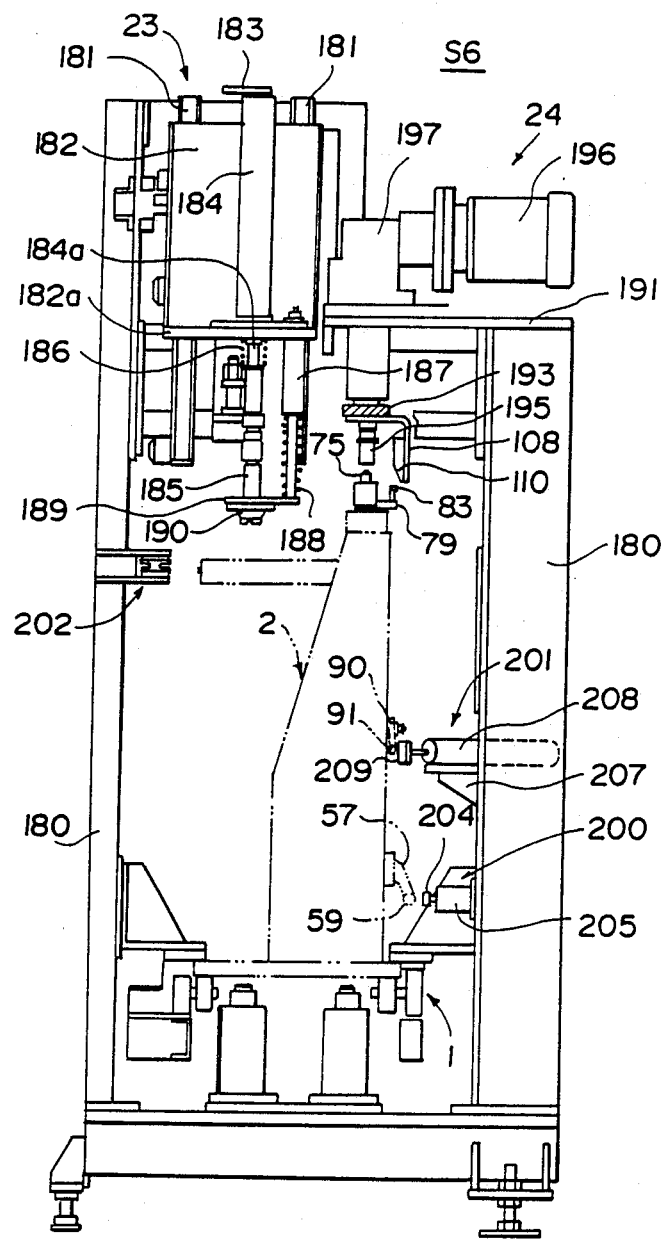
FIG. 34 is a schematic side view of the sixth station.
Figure 35:
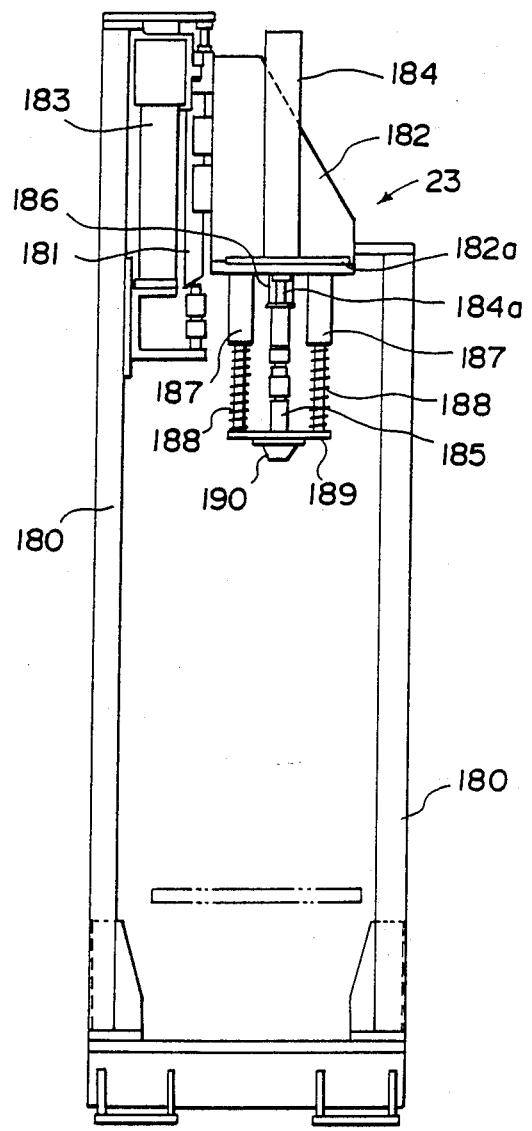
FIG. 35 is a schematic front view of the sixth station.

The shock absorber clamp 31 is mounted on the support plate 41 below the stationary support 30. The shock absorber clamp 31 has left and right clamp claws 50 as shown in FIG. 13. Each clamp claw 50 is supported for rotation by a pin 51 at an intermediate portion thereof. The clamp claws 50 are provided with rollers 50a which are brought into abutment against the shock absorber 4 from the front side. The clamp claws 50 are urged to close by springs 52. Stopper 53 abuts against the rear end portion of the claws 50 to determine the closed position thereof. The claws 50 are provided with tapered surfaces 50b on the inner sides of the respective rear end portions. When a clamp rod 54 is pushed forward, a tapered member 54a on the front end of the clamp rod 54 is inserted between the tapered surfaces 50b and abut against the tapered surfaces, thereby closing the claws 50. The clamp rod 54 is supported on a guide 55 mounted on the support plate 41 and is slidable in the horizontal direction under the guidance of the guide 55. The clamp rod 54 is urged rearward by a spring 56 and is provided with an engagement pin 54b extending in the transverse direction thereof. A shock absorber release levers 57 are mounted for rotation about a pivot pin 57a on opposite sides of the guide 55. The shock absorber release lever 57 is provided with a projection 57b which is engaged with the engagement pin 54b when the clamp rod 54 is in the forward position, thereby locking the clamp rod 54 in the forward position. The shock absorber release lever 57 is urged to engage with the engagement pin 54b by a spring 58 which is connected to the front end portion of the lever 57. The part of the shock absorber release lever 57 on the rear of the pivot pin 57a is bent downward and a roller follower 59 is mounted on the lower end of the shock absorber release lever 57. The roller follower 59 is actuated by a shock absorber unclamp mechanism 200 (shown in FIG. 34 and will be described later) and unclamp the shock absorber 4. The tapered member 54a on the clamp rod 54 is slidably mounted on the clamp rod 54 and is urged forward by a spring 60 (FIG. 13).

Figure 14:
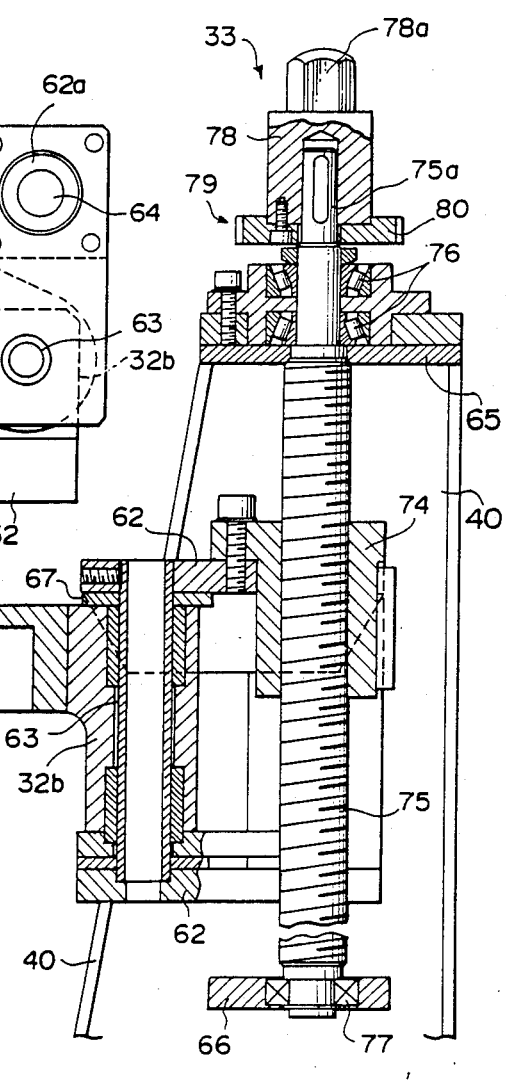
FIG. 14 is a cross-sectional view of the feed mechanism.

Said pair of compressing claws 32 are disposed above the coil spring 3 which is set on the upper portion of the shock absorber 4, and are opened and closed. Each of the compressing claws 32 is provided, on the inner side of the front end portion, with a holding portion 32a which holds the mount rubber 5 on the upper end of the coil spring 3. Each compressing claw 32 has a tubular rear support portion 32b mounted for rotation in the horizontal direction on one of vertical shafts 63 which are mounted on the left and right front portions of an up-and-down frame 62 (FIG. 14). The up-and-down frame comprises upper and lower plates which supports rear support portions 32b of the compressing claws 32 from above and from below. The up-and-down frame 62 is provided with tubular guide portions 62a which are formed on left and right rear portions of the up-and-down frame 62 and are fit on guide rods 64 to be slidable up and down. The guide rods 64 are disposed between an upper plate 65 which connects the upper ends of the vertical frames 40 and a lower plate 66 which extends horizontally at an intermediate portion of the vertical frames 40.

Figure 12:
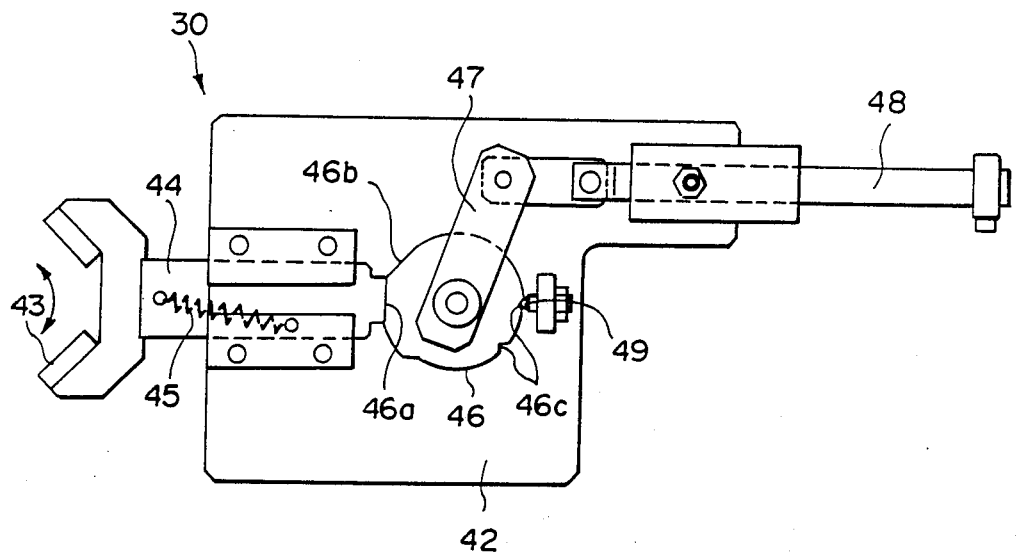
FIG. 12 is a plan view of the stationary support.
Figure 15:
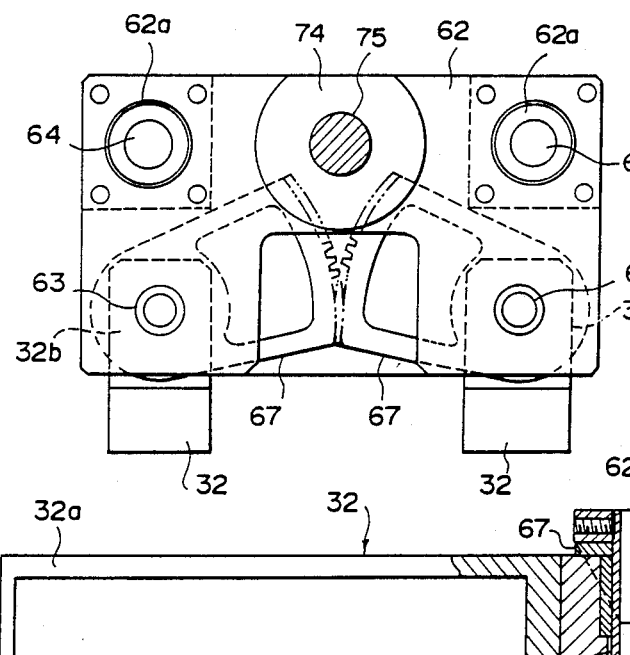
FIG. 15 is a fragmentary plan view showing the up-and-down frame.
Figure 16:
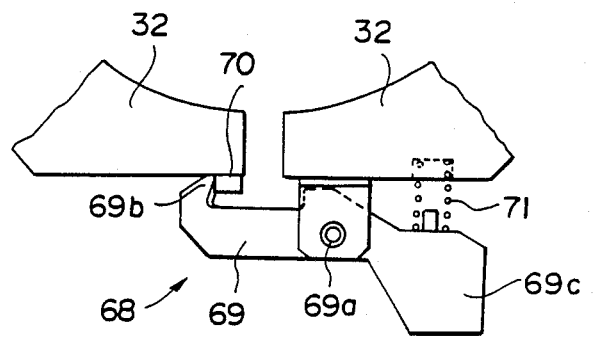
FIG. 16 is a fragmentary plan view showing a part of the compressing claws.
Figure 17:
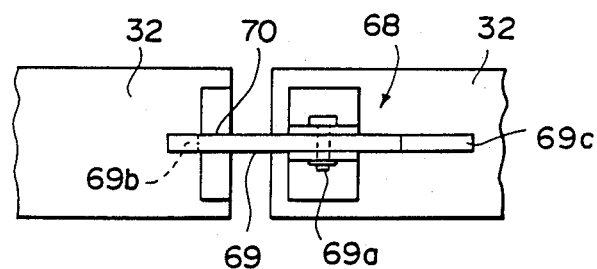
FIG. 17 is a front view of the part shown in FIG. 16.

As shown in FIG. 12, the compressing claws 32 are supported for rotation by shafts 63 at respective base ends 32b, and are moved in synchronization with each other by way of engagement of sector gears 67. The compressing claws 32 are manually closed by the operator and are held in the closed position by a compressing claw locking mechanism 68. As shown in FIGS. 16 and 17, the compressing claw locking mechanism 68 comprises a lock lever 69 rotatably mounted on the free end of one of the compressing claws 32 by a pin 69a and an engagement piece 70 which is mounted on the free end of the other compressing claw 32 and is engaged with one end 69b of the lock lever 69. The lock lever 69 is provided with a protrusion 69c on the other end thereof. The lock lever 69 is urged toward the lock position in which the end 69b is engaged with the engagement piece 70 by a spring 71 disposed between the protrusion 69c and the end portion of the compressing claw 32. The lock lever 69 is caused to release the compressing claws 32 by a compressing claw unclamp mechanism 202 (FIG. 37) at the sixth station S6 as will be described later. As shown in FIG. 5, a temporary lifting-rod support 72 which temporarily supports the lifting rod 16 and is pipe-like in shape, and said temporary support jig 73 which temporarily supports the actuator casing 13 or the set plate 14 are disposed beside one the compressing claws 32. Said temporary spring support jig 61 which temporarily supports the coil spring 3 is obliquely mounted on one side of the base plate 35.

The compressing claws 32 are connected to the feed mechanism 33 to be moved up and down and stopped at a desired position. The compressing claws 32 are supported by the up-and-down frame 62 as described above. The up-and-down frame 62 is moved up and down under the guidance of the guide rods 64 which are engaged with the guide portions 62a of the up-and-down frame 62. As shown in FIG. 14, a ball screw 74 is fixed to the rear side of the up-and-down frame 62 and a lead screw 75 vertically extends in parallel to the guide portions 62a along the up-and-down frame 62. The ball screw 74 is in mesh with the lead screw 75 and is moved up and down in response to revolution of the lead screw 75. The upper end portion of the lead screw 75 is supported for rotation by an upper plate 65 and a bearing 76 and the lower end portion of the lead screw 75 is supported for rotation by a lower plate 66 and a bearing 77. The upper end 75a projects upward through the upper plate 65, and a revolution lock mechanism 79 is disposed with respect to the upper end 75a of the lead screw 75. Further, a driving engagement member 78 is mounted on the upper end 75a and has a bolt head 78a which is drivingly engaged with sockets of the compression driving mechanisms 17 and 18 at the second and third stations S2 and S3 and the release driving mechanism 24 at the sixth station S6.

As shown in FIGS. 18 and 19, the revolution lock mechanism 79 comprises a gear 80 fixed to the upper end 75a of the lead screw 75 to rotate together with the lead screw 75, and a latch lever 81 which is pivoted by a pin 81b and has a latch portion 81a which is engaged with the gear 80. The latch lever 81 is urged by a spring 82 toward a position in which the latch portion 81a is engaged with the gear 80. A roller follower 83 is mounted on the end of the latch lever 81 opposite to the end portion on which the latch portion 81a is provided. When the driving mechanism 17, 18 or 24 is moved downward and a cam surface 110 of a cam member 108 (to be described later) abuts against the roller follower 83, the latch lever 81 is rotated so that the latch portion 81a is disengaged from the gear 80 and permits revolution of the lead screw 75.

Figure 20:
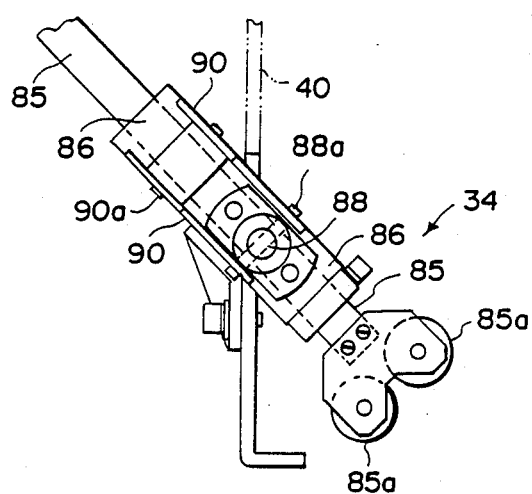
FIG. 20 is a fragmentary plan view showing a part of the rod retainer mechanism.
Figure 22:
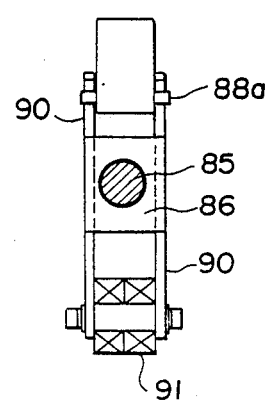
FIG. 22 is a front view of the rod retainer mechanism.
Figure 21:
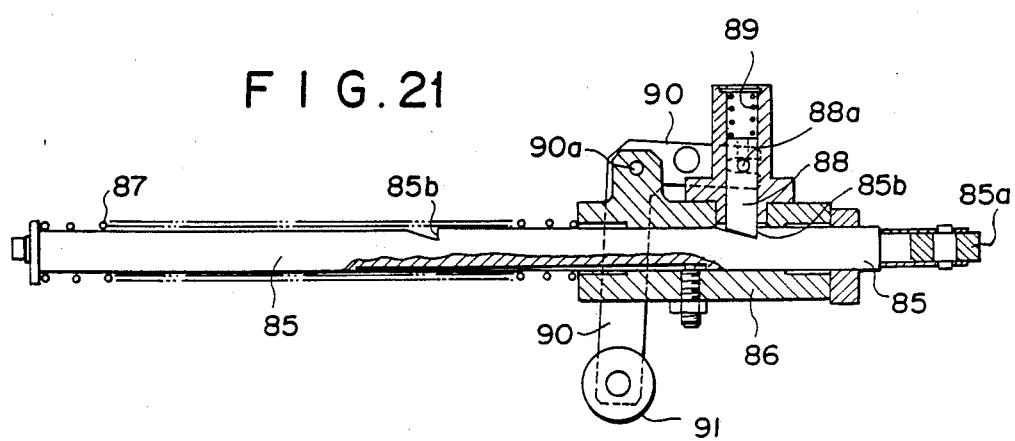
FIG. 21 is a side view partly in cross-section of the rod retainer mechanism.
Figure 23:
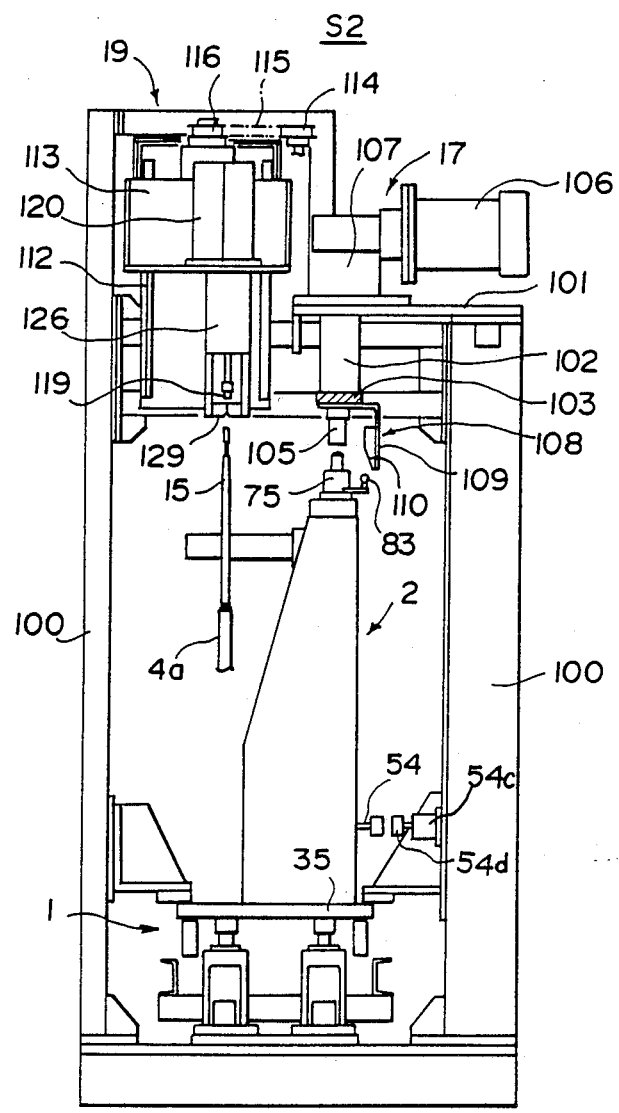
FIG. 23 is a schematic side view of the second station.
Figure 24:
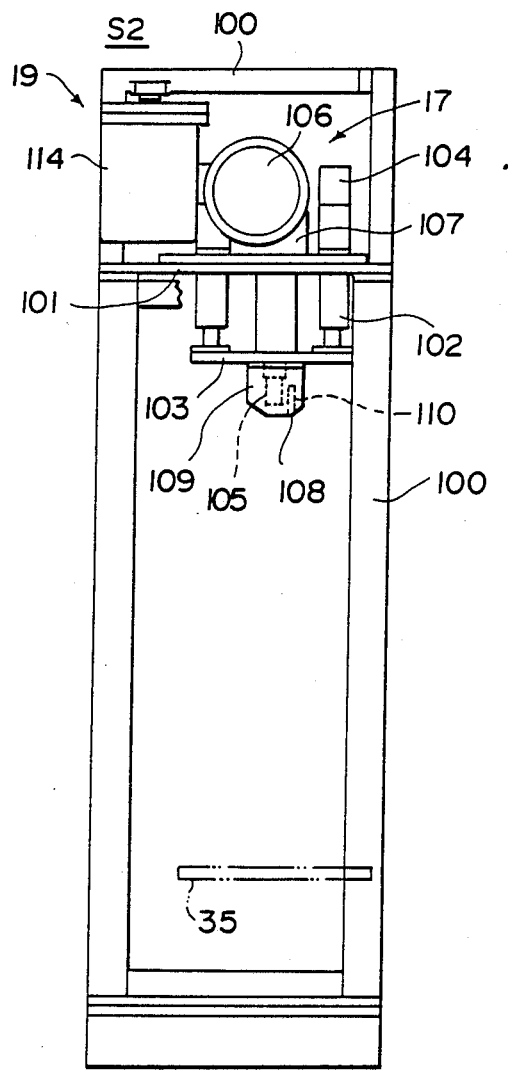
FIG. 24 is a schematic rear view of the second station.
Figure 25:
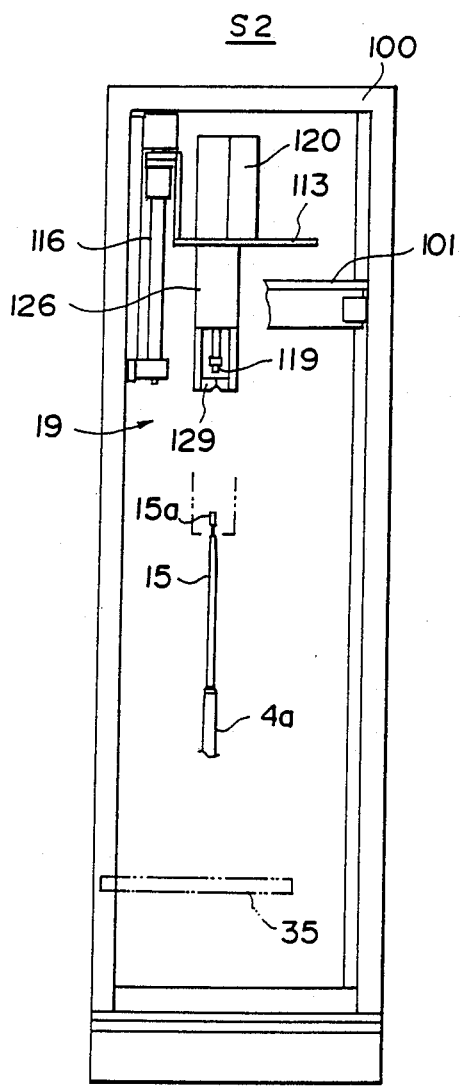
FIG. 25 is a schematic front view of the second station.

As shown in FIGS. 20 to 22, said rod retainer mechanism 34 which prevents the rod 4a from moving downward includes a lock rod 85 which is mounted on one of the vertical frames 40 and can be diagonally moved toward and away from the rod 4a. The lock rod 85 has a pair of rollers 85a on the free end thereof, and the rollers 85a are brought into contact with the outer surface of rod 4a through the space between the pitches of the coil spring 3 and holds the rod 4a so that it does not move downward. The lock rod 85 is supported for sliding motion by a tubular guide member 86 and extends through the guide member 86. The lock rod 85 is urged toward the retracted portion by a spring 87. Further, a pair of notches 85b are formed on the upper surface of the lock rod 85 in predetermined positions. A latch member 88 is provided above the lock rod 85 and is urged toward the upper surface of the lock rod 85 by a spring 89. The latch member 88 is engaged with one of the notches 85b when the lock rod 85 is in the retracted position and with the other notch when the lock rod 85 is in the operative position in which it is in contact with the rod 4a and holds the rod 4a. The latch member 88 is operatively connected with a release lever 90 by way of a pin 88a. The release lever 90 is rotatable about a pin 90a and is provided with a roller follower 91 at the lower end thereof. The release lever 90 is actuated to lift the latch member 88 away from the lock rod 85 by a lock rod unclamp mechanism 201 which acts on the roller follower 91 at the sixth station S6.

At the first station S1, the shock absorber 4 is set on the pallet 2 with the lower end portion of the shock absorber 4 placed on the lower end support 29 and the intermediate portion of the shock absorber 4 forced into between the clamp claws 50 of the shock absorber clamp 31 and pressed against the stationary support 30.

When the coil spring 3 is compressed by the compressing claws 32, the coil spring 3 is first positioned with respect to the shock absorber 4 and then the spring seat 5 and the like are set to the upper end of the coil spring 3. In this state, the compressing claws 32 are manually closed and are positioned above the coil spring 3.

Then the coil spring 3 is compressed at the second or third station S2 or S3. The clamping of the shock absorber 4, the compression of the coil spring 3, the lifting of the rod 4a, and the transfer of the lifting rod 15 are automatically accomplished. The operation of the shock absorber clamp 31, the compression driving mechanism 17 and the lifting mechanism 19 at the second station S2 will be described with reference to FIGS. 23 to 28, hereinbelow.

At the second station S2, a gate-like frame 100 is disposed above the conveyor line 1 and the compression driving mechanism 17 and the lifting mechanism 19 are mounted on the upper portion of the frame 100. The compression driving mechanism 17 comprises an up-and-down plate 103 which is supported for up-and-down movement on an upper transverse member 101 of the frame 100 by way of a pair of guide rods 102, and a pair of cylinders 104 which are connected to the upper ends of the guide rods 102 and move up and down the guide rods 102. A socket 105 which is engaged with said driving engagement member 78 on the upper end of the lead screw 75 is mounted on the up-and-down plate 103. The output power of a driving motor 106 mounted on the upper transverse member 101 is transmitted to the socket 105 by way of a reduction gear mechanism 107. The pallet 2 is conveyed by the conveyor line 1 and is locked in a predetermined position at each station. Further, a shock absorber clamp actuator is provided at the second station S2. The shock absorber clamp actuator comprises a cylinder-piston mechanism 54c (FIG. 23) which is mounted on the frame 100 and a pusher 54d which is connected to the piston rod of the cylinder-piston mechanism 54c and is arranged to push the clamp rod 54 toward the clamp claws 50 so that the tapered member 54a on the front end of the clamp rod 54 is inserted between the tapered surfaces 50b of the clamp claws 50 and abut against the tapered surfaces, thereby closing the claws 50 and hold them in the closed state. In this state, the shock absorber 4 is held by the claws 50 and the stationary support 30.

Further, the cam member 108 (FIGS. 23 and 24) which releases the revolution lock mechanism 79 of the feed mechanism 33 is mounted on the up-and-down plate 103. The cam member 108 is mounted on a support plate 109 which is connected to the up-and-down plate 103 and extends vertically. The cam member 108 has a cam surface 110 which is tapered downward. When the up-and-down plate 103 is moved downward, the cam surface 110 is brought into contact with the roller follower 83 of the latch lever 81 of the revolution lock mechanism 79 and disengages the latch portion 81a from the gear 80, and at the same time, the socket 105 is brought into engagement with the driving engagement member 78 on the upper end of the lead screw 75.

Thus, the lead screw 75 is revolved by the driving motor 106 by way of the engagement of the socket 105 and the driving engagement member 78, and the up-and-down frame 62 is moved downward in response to the revolution of the lead screw 75. At this time, the compressing claws 32 are moved downward together with the up-and-down frame 62 and compresses the coil spring 3. When the up-and-down frame 103 moves upward and the socket 105 is disengaged from the driving engagement member 78, the cam member 103 is moved away from the roller follower 83 and the latch portion 81a of the latch lever 81 is brought into engagement with the gear 80, thereby preventing revolution of the lead screw 75. Accordingly, the compressing claws 32 are held in the position and the coil spring 3 is held compressed.

Figure 26:
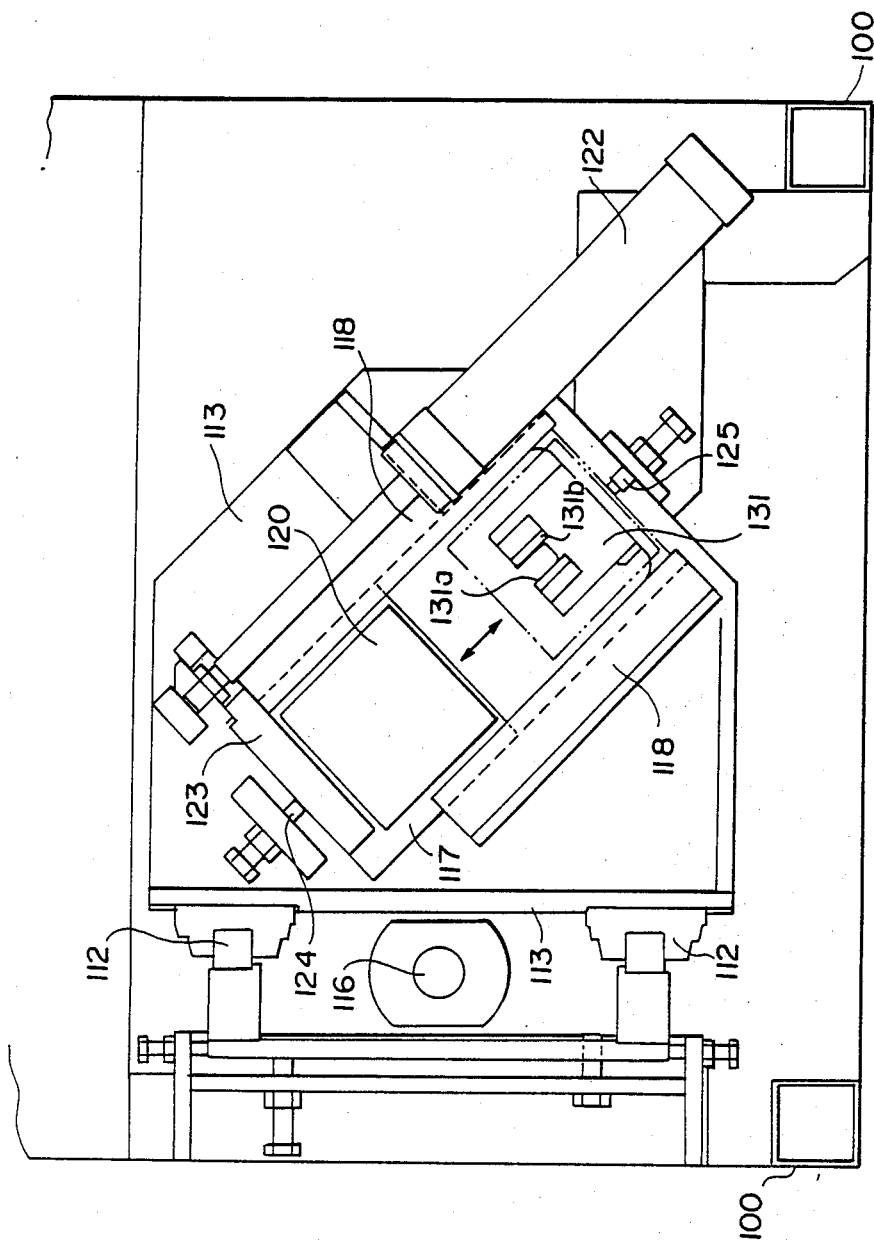
FIG. 26 is a schematic plan view showing a part of the second station.
Figure 27:
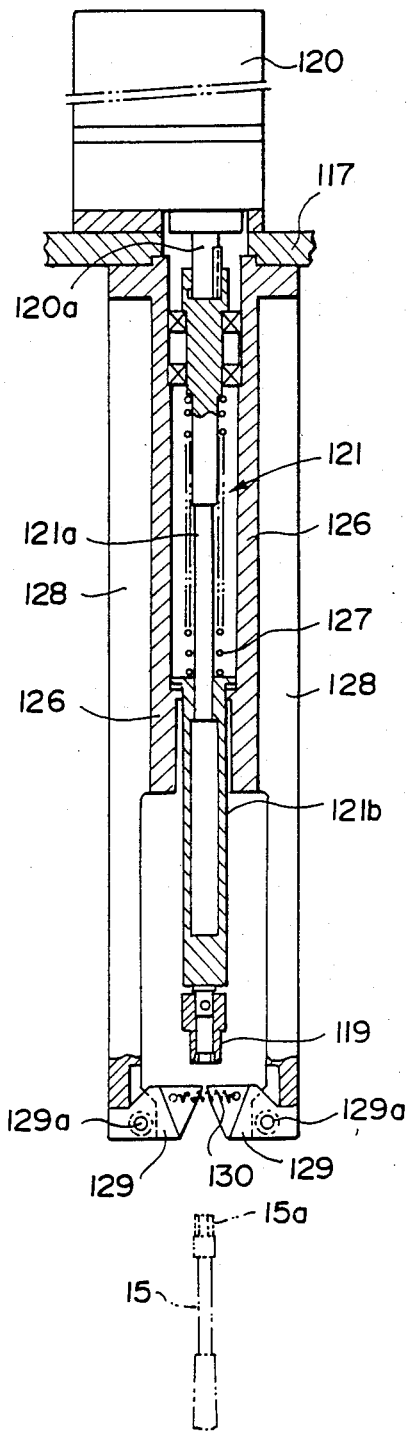
FIG. 27 is a cross-sectional view showing a part of the lifting mechanism.
Figure 28:
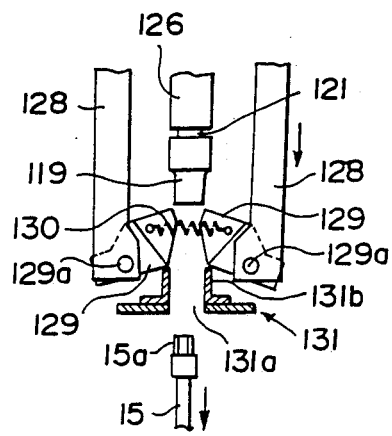
FIG. 28 is a fragmentary front view for illustrating the operation of the lifting mechanism.

Said lifting mechanism 19 comprises a support member 113 which are supported for up-and-down movement by a vertical guide rail 112 extending along the vertical portion of the gate-like frame 100, and a lead screw 116 which is driven by a driving motor 114 by way of a transmission member 115 and moves the support member 113 up and down. As shown in FIGS. 26 and 27, a slide plate 117 is mounted on the support member 113 to be horizontally movable along a slide guide 118 between a first position in which it is aligned with the shock absorber 4 and a second position in which it is aligned with the temporary support jig 72. A rotary shaft 121 which is driven by a motor 120 and is provided with a socket 119 is mounted on the slide plate 117. The slide plate 117 is connected to a piston-cylinder mechanism 122 by way of a connecting member 123 and is moved between the two positions by the piston-cylinder mechanism 122. Stoppers 124 and 125 define the two positions.

The upper end of the rotary shaft 121 is directly connected to the driving shaft 120a of the motor 120. The rotary shaft 121 comprises upper and lower halves 121a and 121b, and the lower half 121b is fitted in the upper half 121a so that the lower half 121b can be revolved integrally with the upper half 121a and can be slid relative to the same. The upper and lower halves 121a and 121b are held in a holder 126. The lower half 121b is urged downward by a spring 127, and a socket 119 which is engaged with the bolt head 15a of the lifting rod 15 is provided on the lower end of the lower half 121b. A pair of vertical members 128 is disposed on opposite sides of the holder 126A. A pair of lifting claws 129 are respectively mounted on the lower end of the vertical members 128 and can be opened and closed. The lifting claws 129 are mounted by pins 129a so that they can open upward, and are urged to the closed position by springs 130. When the support member 113 is moved downward and the lifting claws 129 abut against the top of the lifting rod 14, the lifting claws 129 open to permit bolt head 15a of the lifting rod 15 to pass therebetween, and close after the shoulder portion below the head 15a passes therebetween. When the lifting claws 129 have closed, the upper sides of the claws 129 engage with the shoulder portion of the lifting rod 15. Accordingly, when the support member 113 moves upward, the lifting rod 15 is pulled upward. A release member 131 is disposed above the temporary support jig 72 of the pallet 2, and when the slide plate 117 is moved from the first position to the second position trailing the lifting rod 15, the lifting rod 15 is inserted into a slit 131a of the release member 131. When the vertical members 128 move downward in this state, protrusions 131b on opposite sides of the slit 131a abut the lifting claws 129 from below and cause the claws 129 to open, which releases the lifting rod 15 and permits it to fall.

The lifting mechanism 19 operates in the following manner. While the lifting rod 15 is connected to the upper end of the rod 4a, the support member 113 is moved downward and the lifting claws 129 are caused to hold the upper end of the lifting rod 15 in the manner described above. Then the support member 113 is moved upward, thereby lifting the rod 4a together with the lifting rod 15, and then said rod retainer mechanism 34 holds the rod 4a in the position. The the socket 119 is rotated by the motor 120 to unscrew the lifting rod 15 off the rod 4a and the support member 113 is moved upward, whereby the lifting rod 15 is removed from the rod 4a. Thereafter, the support member 113 is moved to the second position above the temporary support member 72, and then is moved downward, which releases the lifting rod 15 and permits it to fall on the temporary support member 72.

Figure 29:
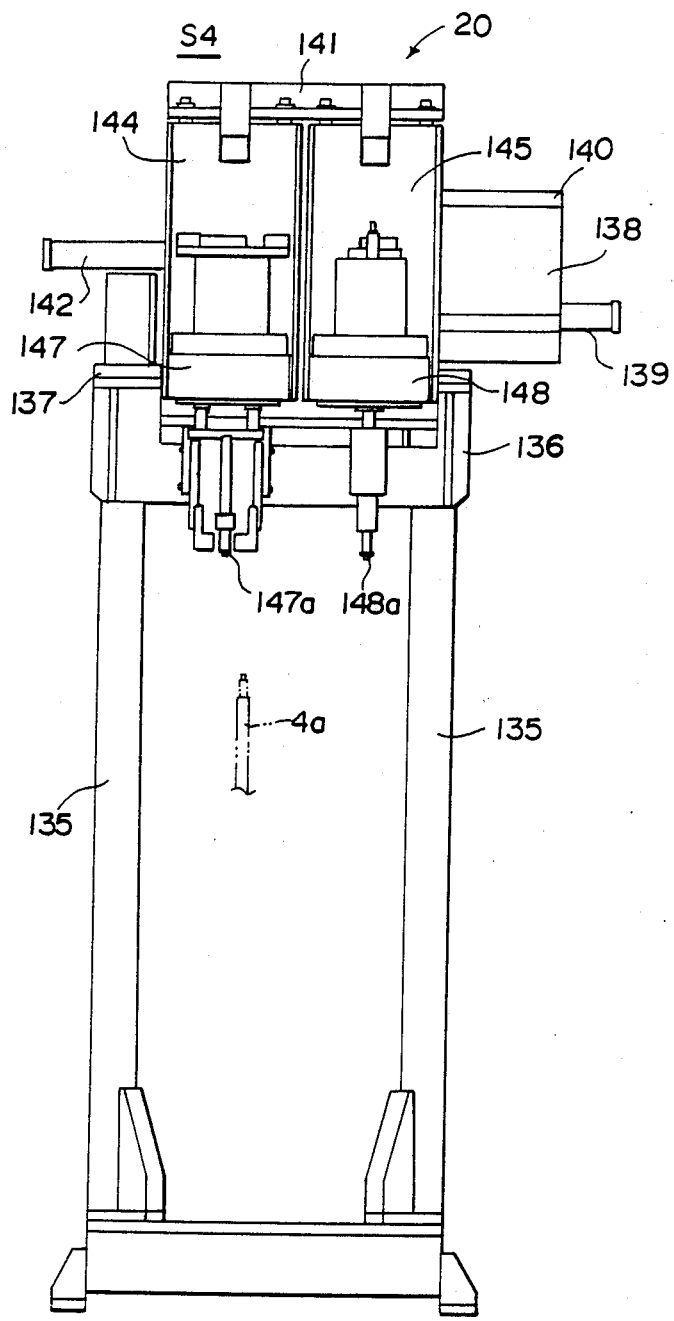
FIG. 29 is a schematic front view of the fourth station.
Figure 30:
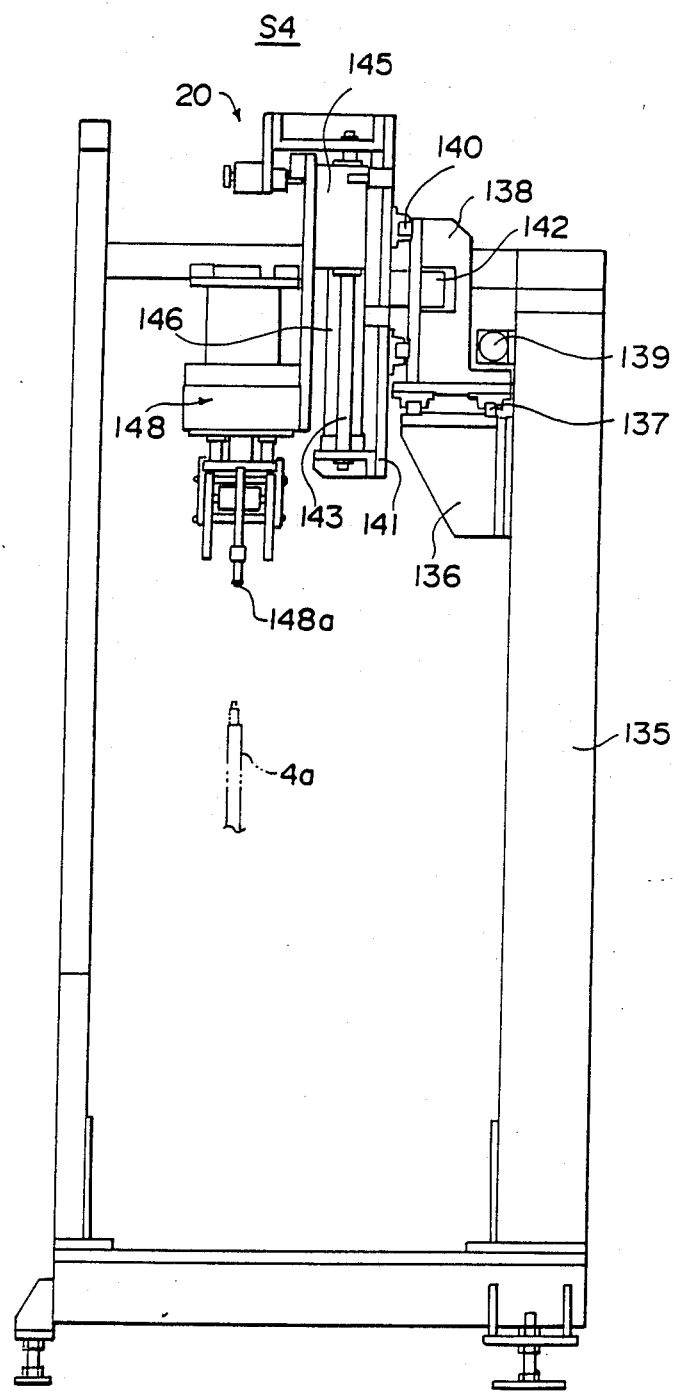
FIG. 30 is a schematic side view of the fourth station.

Said transfer mechanism 20 which transfers the actuator casing 13 or the set plate 14 on the temporary support jig 73 to the mount rubber 5 comprises, as shown in FIGS. 29 and 30, a support member 136 which is mounted on the upper portion of the gate-like frame 135 which is provide above the conveyor line 1. The support member 136 extends horizontally in parallel to the conveying direction of the conveyor line 1. A pair of rails 137 are horizontally mounted on the support member 136. A first transverse traveling base 138 is mounted on the rails 137 to be movable in the conveying direction of the conveyor line 1. The first transverse traveling base 138 is moved horizontally transversely by a first shift cylinder-piston mechanism 139. A pair of rails 140 are provided in front of the first transverse traveling base 138, and a second transverse traveling base 141 is mounted on the rails 140 to be movable in the conveying direction of the conveyor line 1. The second transverse traveling base 141 is moved transversely by a second shift cylinder-piston mechanism 142.

A plurality of guide rods 143 are provided in front of the second transverse traveling base 141, and left and right up-and-down bases 144 and 145 are provided to be movable up and down along the guide rods 143. The up-and-down bases 144 and 145 are separately driven by a pair of cylinder-piston mechanisms 146 (only one of them is seen in FIG. 30). An actuator casing chuck head 147 is mounted on the front side of the left up-and-down base 144 and a set plate chuck head 148 is mounted on the front side of the right up-and-down base 145. The chuck heads 144 and 145 respectively have chuck portions 147a and 148a which hold the actuator casing 13 and the set plate 14 on the temporary support jig 73 and set them on the upper end of the rod 4a.

The chuck head 147 or 148 is used according to the type of the suspension 6 to be assembled on the pallet 2. That is, the first cylinder-piston mechanism 139 moves the first transverse traveling base 138 so that one of the chuck heads 147 and 148 is brought to the operative position. Thereafter, the chuck head in the operative position is moved by the cylinder-piston mechanism 146 and the second cylinder-piston mechanism 142 moves the second transverse traveling base 141 so that the chuck head in the operative position is brought to the position opposed to the temporary support jig 73. Then the chuck head holds the actuator casing 13 or the set plate 14 and sets it on the upper end of the rod 4a.

Figure 31:
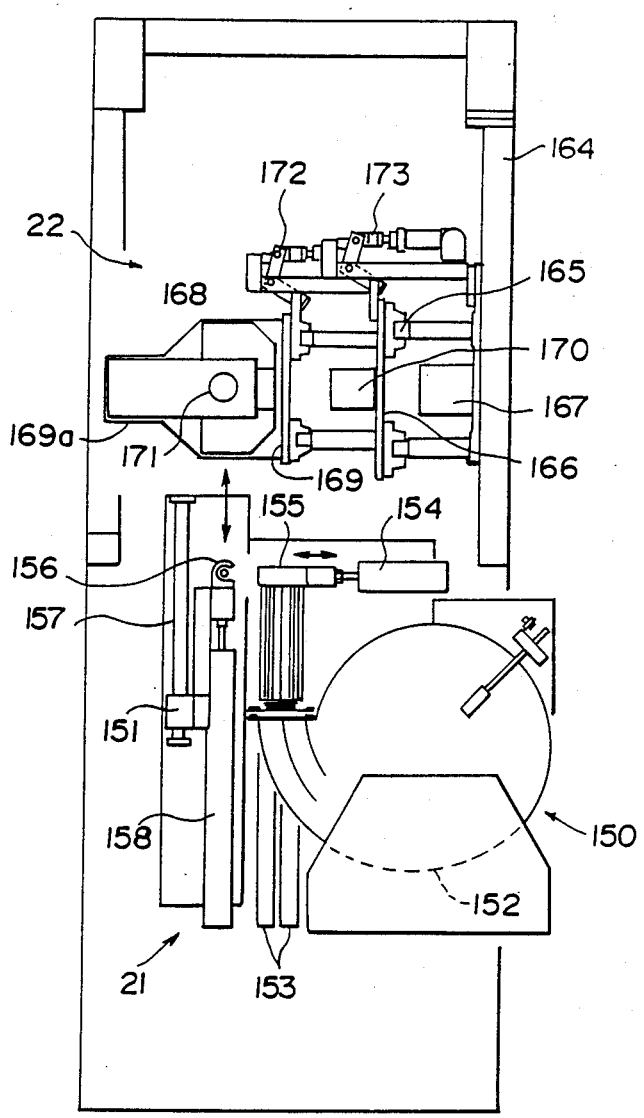
FIG. 31 is a schematic plan view of the fifth station.
Figure 32:
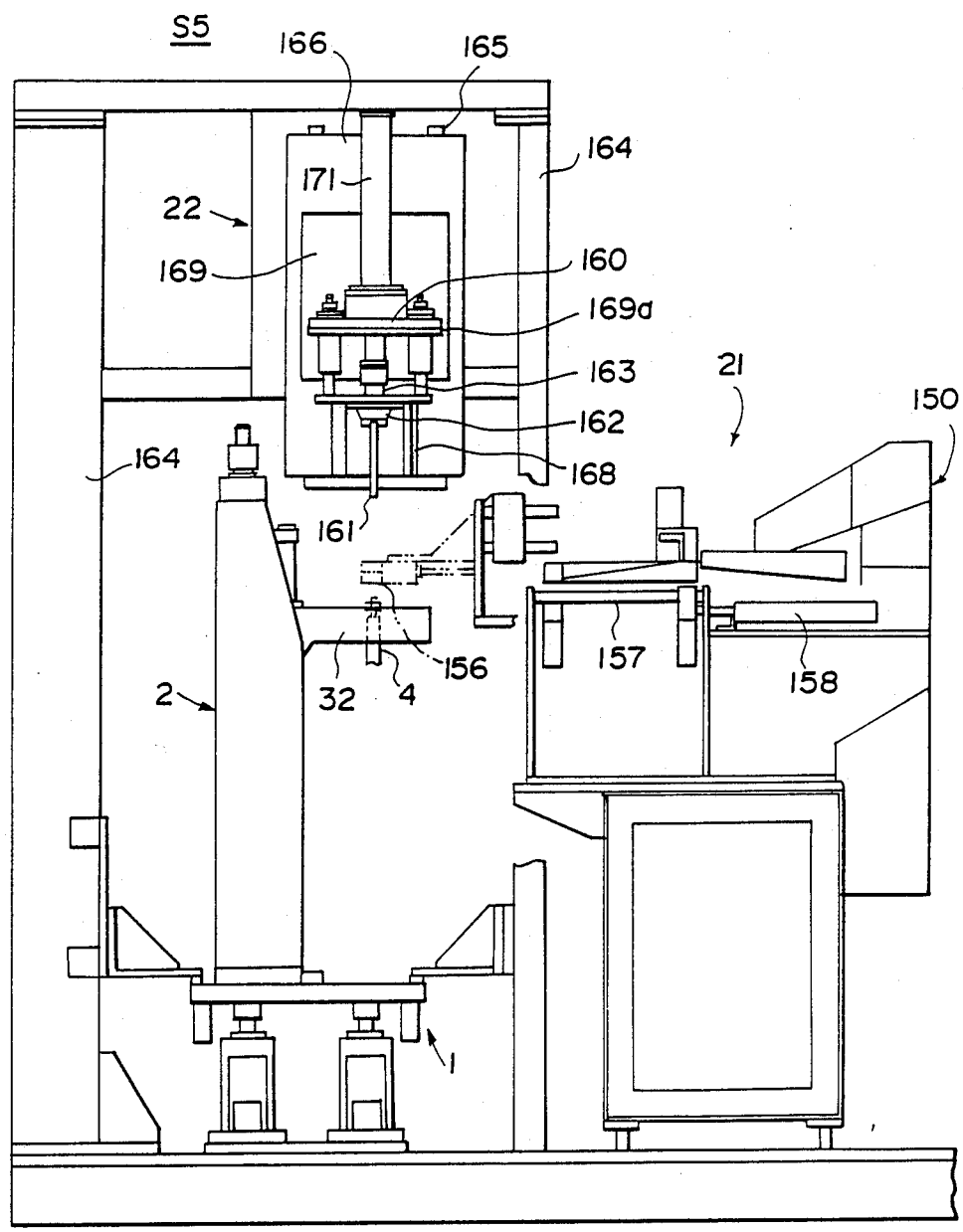
FIG. 32 is a schematic side view of the fifth station.
Figure 33:
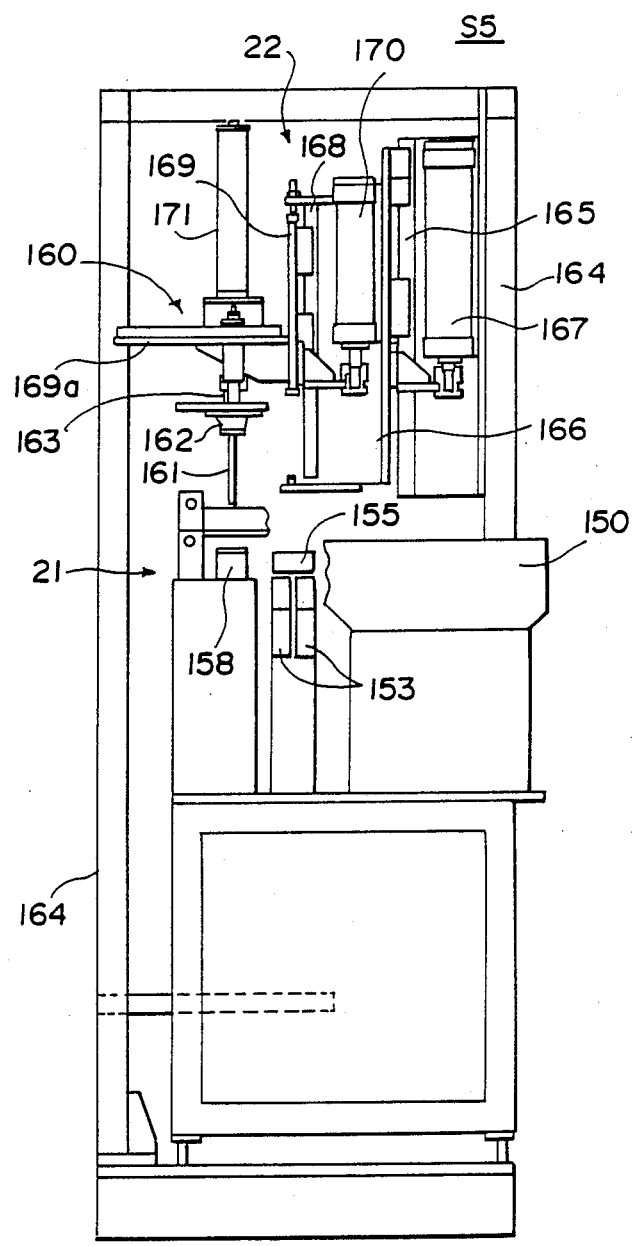
FIG. 33 is a schematic front view of the fifth station.

At the fifth station S5, the feed mechanism 21 sets the washer 7 and the nut 8 on the upper end of the rod 4a, and the temporary tightening mechanism 22 temporarily tightens the nut 8. As shown in FIGS. 31 to 33, the feed mechanism 21 comprises a feeder 150 and a loader 151. The feeder 150 comprises a vibrating container 152 which arranges in rows a plurality of washers 7 and a plurality of nuts 8 placed therein, and a pusher 153 which feeds forward the washer 7 and the nut 8 pair by pair, and a slide member 155 which is actuated by a feed cylinder-piston mechanism 154 and feeds the washer and the nut 8 superposed thereon to the loader 151. The loader 151 has a nut holder 156 which receives the nut 8. The holder 156 is slidable along a guide 157 and is driven by a cylinder-piston mechanism 158 to bring the washer 7 and the nut 8 to a predetermined position above the rod 4a on the pallet 2.

The temporary tightening mechanism 22 comprises a temporary tightening head 160 having a nut guide 161. When the nut 8 and the washer 7 are brought to the predetermined position, the temporary tightening head 160 is moved downward and the nut guide 161 is inserted into the aligned openings of the washer 7 and the nut 8. The temporary tightening head 160 has a revolution restrainer 162 which holds the rod 4a not to revolve by way of the actuator casing or the set plate 14.

Similar revolution restrainers are also provided at the sixth station S6. The revolution restrainer 162 will be described in detail later with reference to FIG. 36. A nut socket 163 is provided so that it can pass through the center of the revolution restrainer 162. Said nut guide 161 projects from the inside of the nut socket 163. The nut guide 161 is resiliently mounted on the nut socket 163 so that it can retract into the socket 163. The temporary tightening head 160 is movable up and down. That is, first rails 165 are fixed to the vertical part of a gate-like frame 164, and a first up-and-down table 166 is mounted on the first rails 165 for up-and-down movement. The first up-and-down table 166 is driven by a first cylinder-piston mechanism 167. Vertical second rails 168 are provided in front of the first up-and-down table 166, and a second up-and-down table 169 is mounted on the second rails 168 for up-and-down movement. The second up-and-down table 169 is driven by a second cylinder-piston mechanism 170. The second up-and-down table 169 is provided with a horizontal member 169a, and a nut runner 171 is vertically mounted on the horizontal member 169a. Said temporary tightening head 160 is fixed to the lower end of the nut runner 171. Movable stoppers 172 and 173 are provided to prevent the first and second up-and-down tables 166 and 169 from falling down from the upper ends of the rails 165 and 168.

When temporarily tightening the nut 8, the temporary tightening head 160 is moved downward by the first cylinder-piston mechanism 167 to a predetermined position with respect to the nut 8 fed by the loader 151, whereby the nut guide 161 is inserted into the central openings of the washer 7 and the nut 8 and the lower end of the nut guide 161 abuts against the upper end of the rod 4a. In this state, the loader 151 is retracted and the washer 7 and the nut 8 are dropped along the nut guide 161 onto the upper end of the rod 4a. Thereafter, the second cylinder-piston mechanism 170 moves downward the temporary tightening head 160 while forcing the nut guide 161 into the socket 163, and the socket 163 is brought into engagement with the nut 8 while the revolution restrainer 162 is brought into abutment against the actuator casing 13 or the set plate 14 on the rod 4a. Then the nut runner 171 is actuated. After the temporary tightening, the temporary tightening head 160 is moved upward to the original position, and the nut guide 161 is allowed to project from the socket 163.

Thereafter, the pallet 2 is conveyed to the sixth station S6, where the regular tightening mechanism 23 tightens the nut 8 with a predetermined torque. Then the release driving mechanism 24 reverses the feed mechanism 33 and moves upward the compressing claws 32, thereby releasing the coil spring 3. The regular tightening mechanism 23 comprises an up-and-down base 182 which is mounted for up-and-down movement on a pair of vertical rails 181 which is provided on the upper portion of a gate-like frame 180. The up-and-down base 182 is driven by a rodless cylinder 183 disposed behind the base 182. The up-and-down down base 182 has a horizontal member 182a and a nut runner 184 is mounted on the horizontal member 182a. The nut runner 184 has a driving shaft 184a which extends downward through the horizontal member 182a. A socket 185 is mounted on the lower end of the driving shaft 184a. The lower end portion of the driving shaft 184a including the socket 185 is made telescopic by virtue of a spring 186. A plate 189 is mounted on the horizontal member 182a to be movable up and down by a pair of telescopic rods 187 and is urged downward by a pair of springs 188. A revolution restrainer 190 is mounted on the lower surface of the plate 189, and the socket 185 is inserted into the central opening of the revolution restrainer 190.

Figure 36:
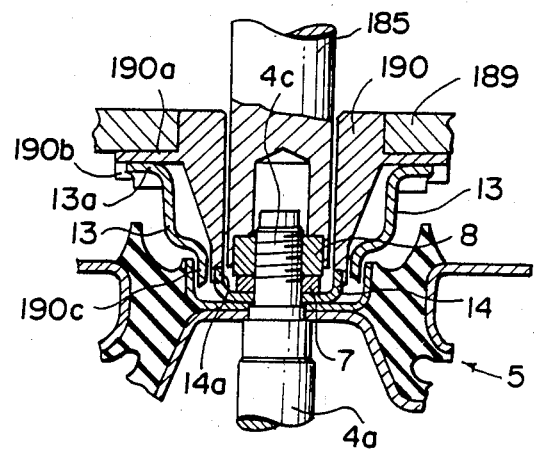
FIG. 36 is a cross-sectional view showing a part of the revolution restrainer.

As shown in FIG. 36, the revolution restrainer 190 is a tubular member having a flange portion 190a. A recess 190b for engaging with a protrusion 13a of the actuator casing 13 is formed on the flange portion 190a. A recess 190c for engaging with protrusions 14a of the set plate 14 is formed on the lower end of the revolution restrainer 190. The revolution restrainer 190 holds the actuator casing 13 or the set plate 14 set on the mount rubber 5 so that the actuator casing 13 or the set plate 14 cannot revolve. As shown in FIGS. 3 and 4, the actuator casing 13 and the set plate 14 have central openings 13b and 14b which are truncated circle in shape. The upper end portion of the rod 4a is also truncated circle in cross-section, and accordingly, when the central opening of the actuator casing 13 or the set plate 14 is engaged with the upper end portion of the rod 4a, the revolution of the rod 4a can be prevented by holding the actuator casing 13 or the set plate 14.

The release driving mechanism 24 comprises, similarly to the compression driving mechanisms 17 and 18, an up-and-down plate 193 which is supported for up-and-down movement on an upper transverse member 191 and is driven by a cylinder-piston mechanism (not shown), and a socket 195 mounted on the up-and-down plate 193. The socket 195 is engaged with the driving engagement member 78 on the upper end of the lead screw 75. The output power of a driving motor 196 is transmitted to the socket 195 by way of a reduction gear mechanism 197. The up-and-down plate 193 is provided with a cam member 108 having a cam surface 110 which releases the revolution lock mechanism 79.

Further, the sixth station S6 is provided with the shock absorber unclamp mechanism 200 which releases the shock absorber clamp 31, the lock rod unclamp mechanism 201 which releases the rod retainer mechanism 34, the compressing claw unclamp mechanism 202 which releases the compressing claw locking mechanism 68.

The shock absorber unclamp mechanism 200 comprises an unclamp cylinder-piston mechanism 205 mounted on the frame 180, and a push member 206 which is mounted on the end of the rod of the unclamp cylinder-piston mechanism 205 and abuts against the roller follower 59 on the lower end of the shock absorber release lever 57 to rotate the lever 57. When the shock absorber release lever 57 is rotated, the clamp rod 54 is moved rearward to permit the claws 50 to open, thereby allowing transfer of the assembled suspension 6.

Further, the lock rod unclamp mechanism 201 comprises an unclamp cylinder-piston mechanism 208 mounted on the frame 180 by way of a bracket 207, and a push member 209 which is mounted on the end of the rod of the unclamp cylinder-piston mechanism 208 and abuts against the roller follower 91 on the lower end of the release lever 90 to rotate the lever 90. When the release lever 90 is rotated, the lock rod 85 is moved rearward to release the rod 4a.

Figure 37:
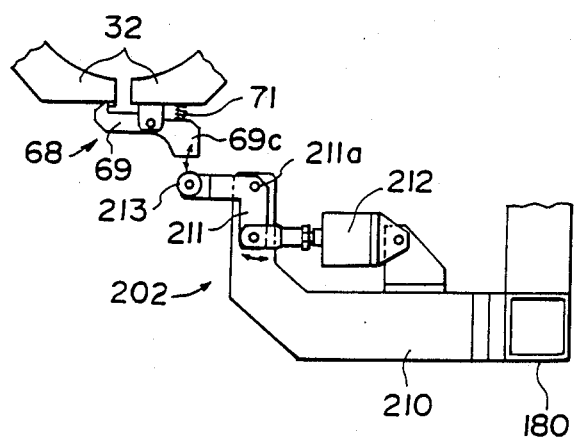
FIG. 37 is a plan view of a compressing claw unclamp mechanism.

As shown in FIG. 37, the compressing claw unclamp mechanism 202 comprises a lever 211 pivoted by a pin 211a on a bracket 210 which is fixed to the frame 180, a roller follower 213 mounted on one end of the lever 211 and a release cylinder-piston mechanism 212 the piston rod of which is connected to the other end of the lever 211. When the lever 211 is rotated and the roller follower 213 abuts against the protrusion 69c of the lock lever 69, the compressing claws 32 are released and allowed to open.

In accordance with the embodiment described above, while the pallet 2 is conveyed from station to station, the shock absorber 4 is held in the upstanding state on the pallet 2 which is conveyed by the conveyor line 1, at the same time, the coil spring 3 is compressed by the driving force provided from the conveyor line and is held in the compressed state, and the rod 4a of the shock absorber 4 is held in the extended state. Accordingly, the operating times at the stations are substantially equalized and the suspension 6 can be assembled with high efficiency.

Another embodiment of the present invention will be described with reference to FIGS. 38 to 43, hereinbelow.

Figure 38:
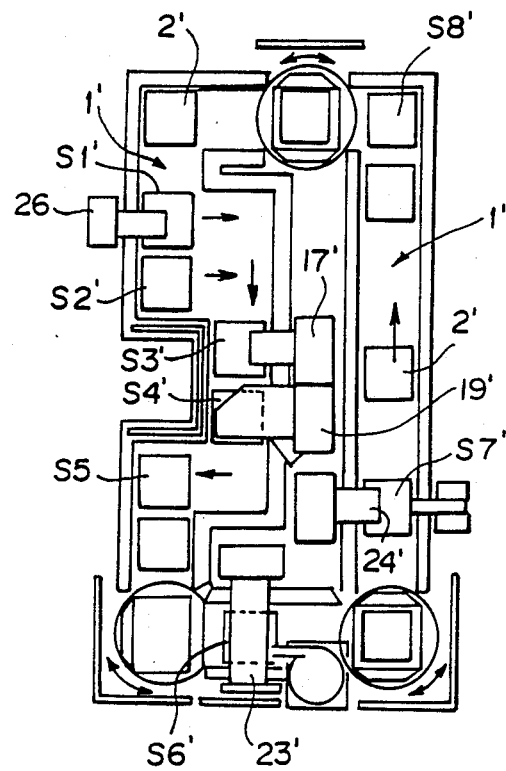
FIG. 38 is a schematic plan view of a suspension assembly system in accordance with another embodiment of the present invention.

In FIG. 38, the suspension assembly system of this embodiment comprises a loop-like conveyor line 1' and first to eighth stations S1' to S8' are disposed along the conveyor line 1'. At the first station S1', the coil spring 3 is set on the pallet 2' and whether the coil spring 3 which has been set on the pallet 2' is a desired one is checked by a coil spring identifying mechanism 26. The coil spring identifying mechanism 26 compresses the coil spring 3 by a predetermined amount and measures the counterforce of the spring 3, and determines whether the coil spring 3 is a desired one through the counterforce of the spring 3. Then at the second station S2', the shock absorber 4 is set on the pallet 2' and the coil spring 3, the mount rubber 5 and the like are set on the shock absorber 4. At the third station S3', the coil spring 3 is compressed by a compression driving mechanism 17' (shown in detail in FIGS. 42 and 43) and held in the compressed state. At the fourth station S4', the rod 4a is lifted to extend by a lifting mechanism 19' and is held there. At the fifth station S5', a bearing and the like are set on the upper end portion of the shock absorber 4 and at the sixth station S6', the nut is temporarily tightened on the upper end portion of the rod 4a, and then tightened with a predetermined torque by a regular tightening mechanism 23'. Thereafter the rod 4a is released and permitted to move downward. After the suspension 6 has thus been assembled, the coil spring 3 is released by a release driving mechanism 24' at the seventh station S7'. Then the assembled suspension 6 is discharged from the line 1' at the eighth station S8'. Thereafter, the pallet 2' is returned to the first station S1'.

Figure 39:
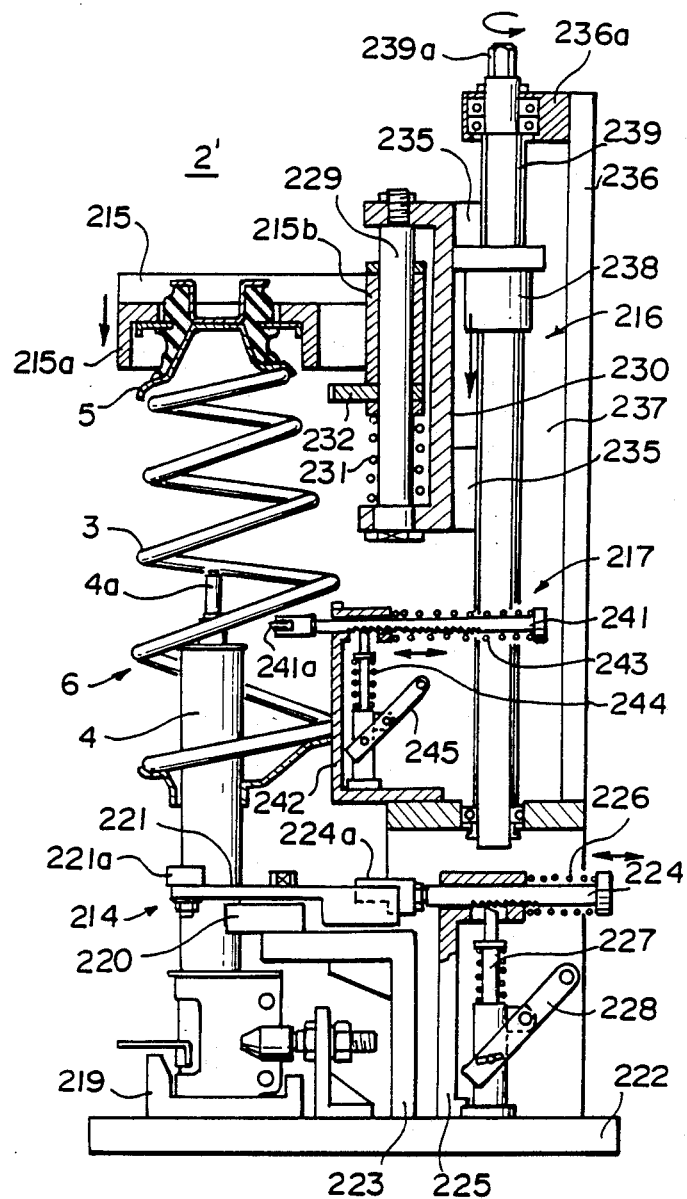
FIG. 39 is a side view partly in cross-section of the pallet with the shock absorber and the coil spring set thereon.
Figure 40:
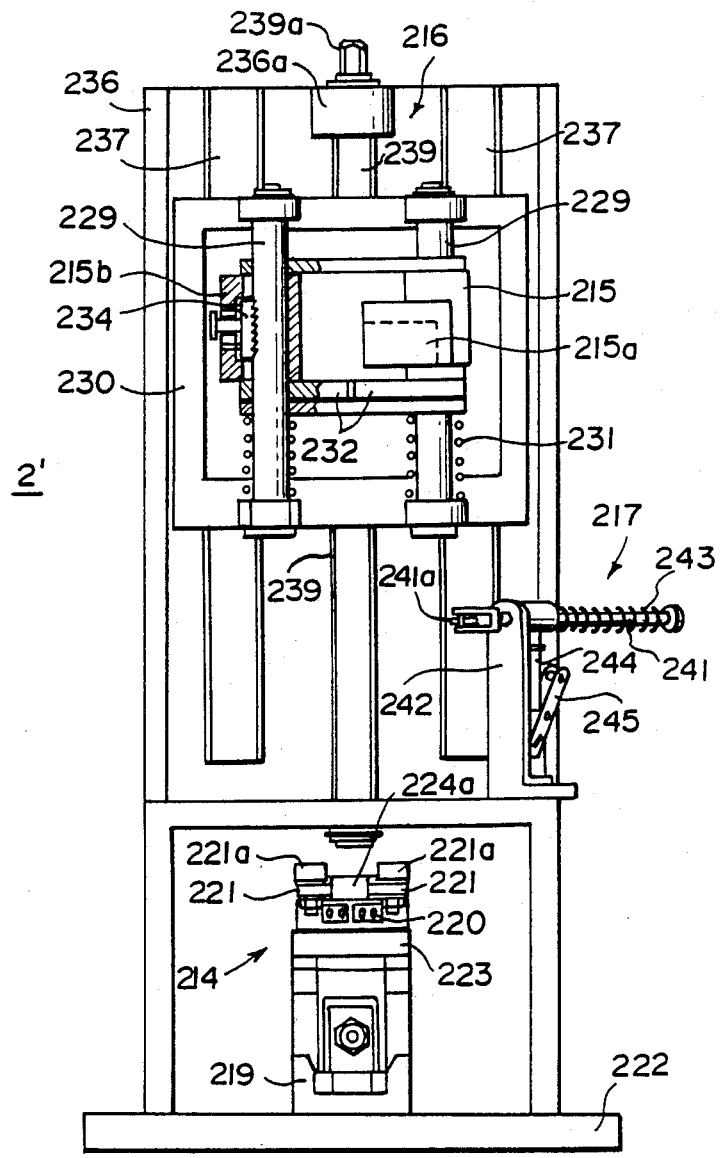
FIG. 40 is a front view partly in cross-section of the pallet.
Figure 41:
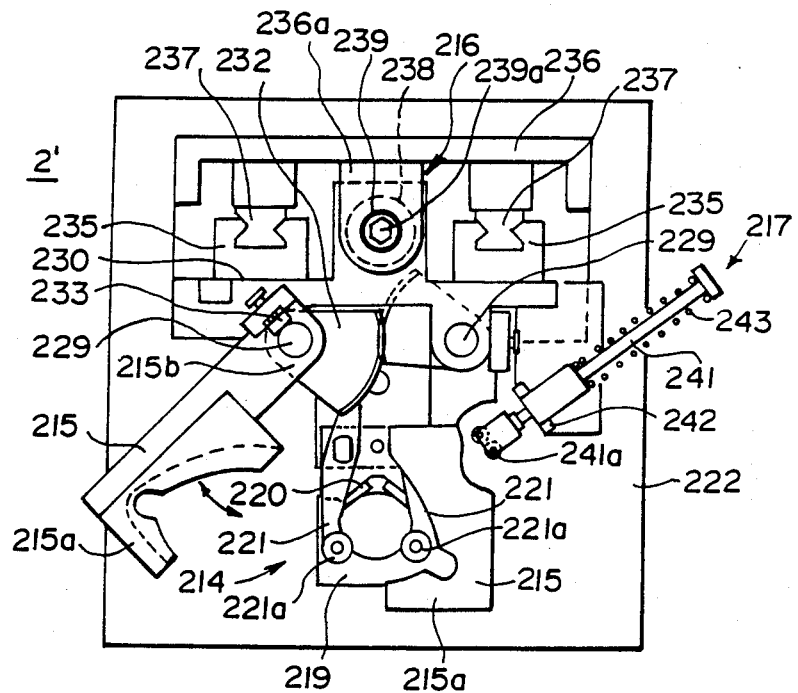
FIG. 41 is a plan view of the pallet.

As shown in FIGS. 39 to 41, the pallet 2' is provided with a shock absorber holder 214 which holds the shock absorber 4 in the upstanding state, a pair of compressing claws 215 which is engaged with the upper end of the coil spring 3, a feed mechanism 216 which moves the compressing claws 215 up and down and holds them in a desired position, and a rod retainer mechanism 217 which holds the rod 4a in the extended state.

The shock absorber holder 214 comprises a lower end support 219 which supports the lower end of the shock absorber 4, a stationary support 220 which holds an intermediate portion of the shock absorber 4 from behind and a pair of shock absorber clamp claws 221 which holds the shock absorber 4 from before. The lower end support 219 is fixed to a base plate 222 of the pallet 2' and the lower end of the shock absorber 4 rests thereon. The central portion of the lower end support 219 is concaved.

The stationary support 220 is mounted on a bracket 223 which is fixed to the base plate 222. The stationary support 220 has a V-shaped end and supports the rear side of an intermediate portion of the shock absorber 4. The pair of shock absorber clamp claws 221 are pivoted above the stationary support 220. The shock absorber clamp claws 221 are provided with rollers 221a which abut against the shock absorber 4 from before. A spring (not shown) which urges the claws 221 away from each other (to open) is disposed between the claws 221. A clamp rod 224 is disposed on the rear side of the shock absorber clamp claws 221 which is movable toward and away from the shock absorber clamp claws 221 and has an engagement piece 224a which is inserted between the rear ends of the shock absorber clamp claws 221 to hold them closed. The clamp rod 224 is mounted on the base plate 222 and is urged away from the shock absorber clamp claws 221 by a spring 226. A latch member 227 is brought into engagement with ratchets formed on the lower surface of the clamp rod 224 and holds it in the position where the engagement piece 224a holds the shock absorber clamp claws 221 closed. The latch member 227 is moved away from the clamp rod 224 by operation of an unclamp lever 228.

The compressing claws 215 are disposed above the coil spring 3 set on the shock absorber 4. Each of the compressing claws 215 is provided with a holding portion 215a. The holding portions 215a of the claws 215 associate to hold the upper end portion of the coil spring 3 by way of the mount rubber 5. The rear ends of the claws 215 are supported by support portions 215b which are fitted on a vertical guide rod 229 to be movable up and down. The guide rod 229 is mounted on an up-and-down frame 229 and the compressing claws 215 are urged upward by a spring disposed below the support portions 215b.

The support portions 215b are provided with sector gears 232 (FIG. 41) which are in mesh with each other so that the compressing claws 215 are closed and opened in synchronization with each other. In FIG. 41, one of the claws 215 is shown as it is in the closed position and the other is shown as it is in the opened position. An engagement piece 233 causes each claw 215 to hold the shock absorber 4 with a proper force. As shown in FIG. 40, a ratchet member 234 holds the compressing claws 215 in a desired position with respect to the frame 230.

The compressing claws 215 are driven by the feed mechanism 216 and can be stopped in any desired position. That is, left and right guides 235 are fixed to the rear side of the up-and-down frame 230 which supports the compressing claws 215 and the guides 235 are engaged with guide rails 237 which are mounted on a vertical frame 236 fixed to the base plate 222, so that the guides 235 are movable up and down along the guide rails 237. Further, a ball screw 238 is mounted on the rear side of the up-and-down frame 230 and is in mesh with a lead screw 239 which extends vertically along the vertical frame 236. Thus, the up-and-down frame 230 is moved up and down in response to revolution of the lead screw 239. The upper end portion of the lead screw 239 projects upward through a transverse member 236a of the vertical frame 236 and forms a driving engagement portion 239a.

The rod retainer mechanism 217 has a lock rod 241 which is diagonally movable toward and away from the rod 4a of the shock absorber 4. The lock rod 241 is supported on a bracket 242 which is mounted on the vertical frame 236. The lock rod 241 has a pair of rollers 241a on the free end thereof, and the rollers 241a are brought into contact with the outer surface of rod 4a through the space between the pitches of the coil spring 3 and holds the rod 4a so that it does not move downward. The lock rod 241 is urged toward the retracted portion by a spring 243. A latch member 244 is provided below the lock rod 241 and holds the lock rod 241 in the operative position in which it is in contact with the rod 4a and holds the rod 4a. The latch member 244 is moved away from the lock rod 241 to release it by operation of a release lever 245.

When the shock absorber 4 is set on the pallet 2' at the second station S2', the shock absorber 4 is placed on the pallet 2' so that the lower end of the shock absorber 4 rests on the lower end support 219, and the clamp rod 224 is manually pushed to close the shock absorber clamp claws 221 with the intermediate portion of the shock absorber 4 abutting against the stationary support 220, thereby pressing the shock absorber 4 against the stationary support 220 by the rollers 221a. Then the the clamp rod 224 is held in the position by the latch member 227.

Then after the coil spring 3 is set on the shock absorber 4 and the mount rubber 5 and the like are set on the upper end of the coil spring 3, the compressing claws 215 are manually closed and positioned above the coil spring 3. In this state, the compressing claws 215 is pushed downward along the guide rod 229 while the holding portions 215 hold the upper end of the coil spring 3. The compressing claws 215 are held in the state by the ratchet member 234.

Figure 42:
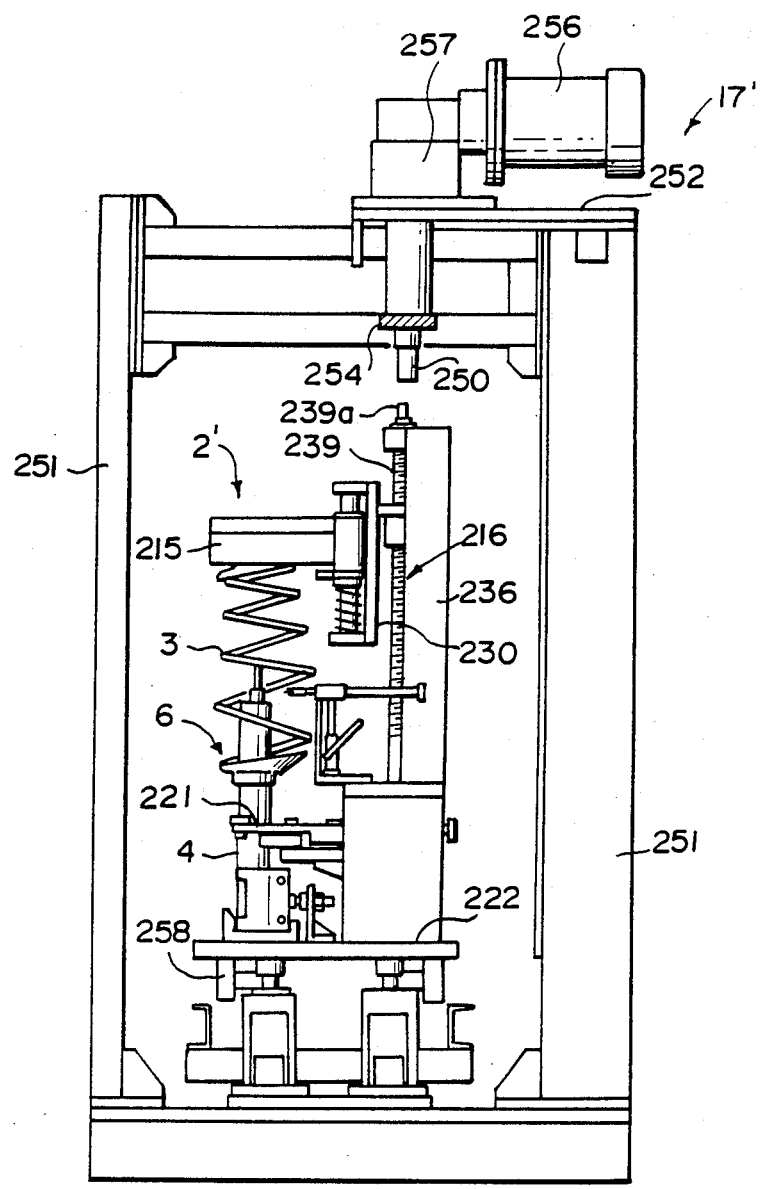
FIG. 42 is a schematic side view showing the driving mechanism of the feed mechanism.

As shown in FIGS. 42 and 43, a gate-shaped frame 251 is provided at the third station S3'. The compression driving mechanism 17' comprises an up-and-down plate 254 which are suspended from the upper transverse member 252 of the frame 251 by a pair of guide rods 253. The guide rods 253 are connected to the piston rods of cylinder-piston mechanisms 255 and the up-and-down plate 254 is moved up and down by the cylinder-piston mechanisms 255. A socket 250 is mounted on the up-and-down plate 254. A driving motor 256 is mounted on the transverse member 252 and the output power of the motor 256 is transmitted to the socket 250 by way of a transmission mechanism 257. The pallet 2' is conveyed by a conveyor 258 and held a predetermined position at the third station S3'. When the pallet 2' is stopped at the third station S3', the up-and-down plate 254 is moved downward so that the socket 250 is brought into engagement with the driving engagement portion 239a of the lead screw 239. Then the driving motor 256 is energized to revolve the lead screw 239. When the lead screw 239 revolves, the up-and-down frame 230 is moved downward, and accordingly, the compressing claws 215 are moved downward and compress the coil spring 3. The compressing claws 215 are held in the position when the driving motor 256 is de-energized.

At the fourth station S4', the rod 4a of the shock absorber 4 is lifted and the lock rod 241 is manually pushed toward the rod 4a, thereby holding rod 4a in the lifted position. The lock rod 241 is held in the position by the latch member 244.

After the suspension 6 has been assembled, the release lever 245 is operated to retract the lock rod 241, thereby releasing the rod 4a. Then the lead screw 239 is revolved in the reverse direction so that the up-and-down frame 230 and the compressing claws 215 are moved upward, and then the ratchet member 234 is released to permit the claws 215 move upward relative to the frame 230, and then the claws 215 are opened. Thus the coil spring 3 is released. Thereafter, the unclamp lever 228 is operated to retract the clamp rod 224 and the shock absorber clamp claws 221 are opened. Then the assembled suspension 6 is taken out from the pallet 2'.

Also in accordance with this embodiment, the operating times at the stations are substantially equalized and the suspension 6 can be assembled with high efficiency.

Figure 45:
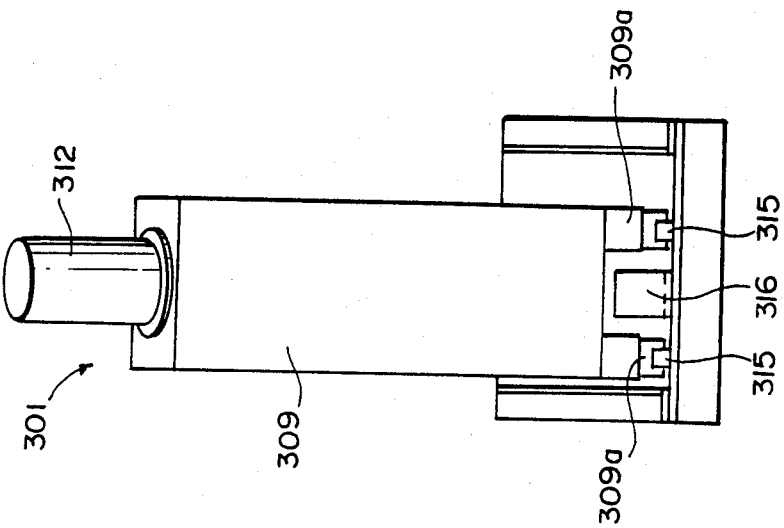
FIG. 45 is a schematic side view of the coil spring identifying mechanism.
Figure 46:
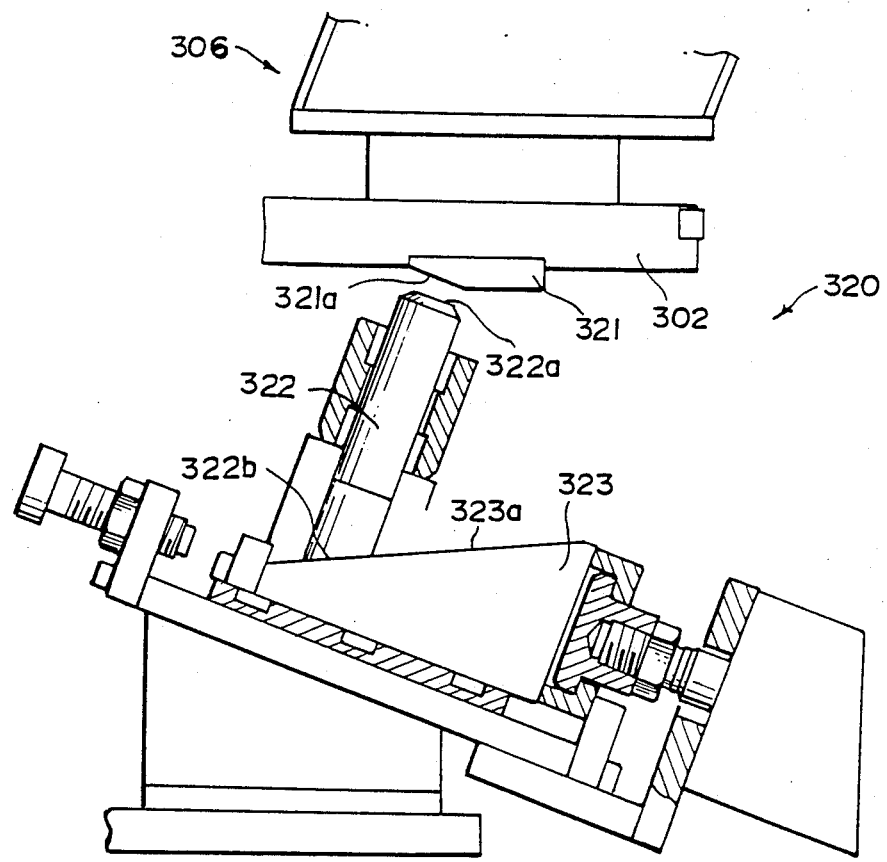
FIG. 46 is a cross-sectional view showing a part of the backup unit.

Now a preferred example of the coil spring identifying mechanism will be described with reference to FIGS. 44 to 46.

Figure 44:
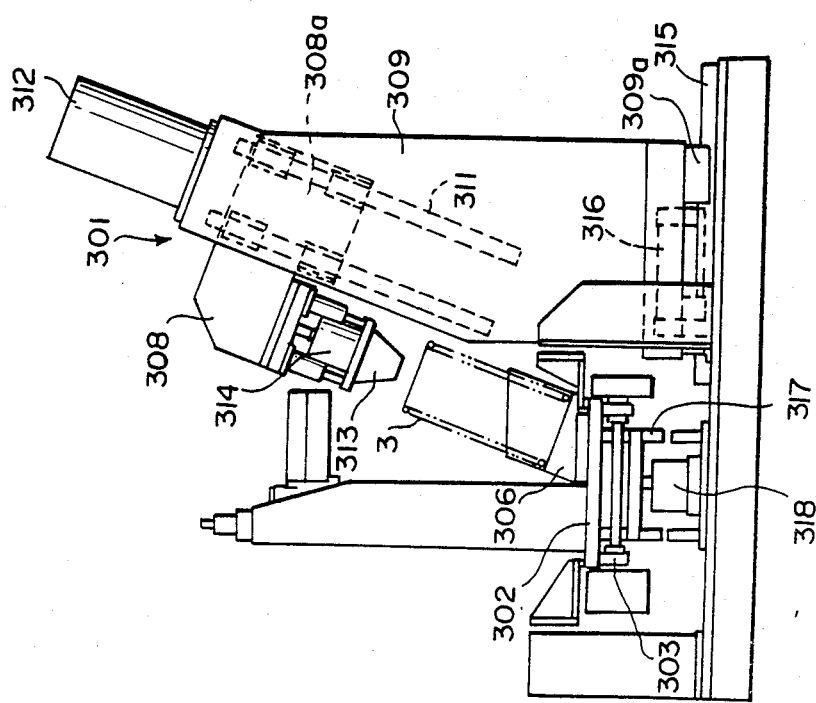
FIG. 44 is a schematic front view of a preferred example of the coil spring identifying mechanism.

In FIG. 44, a pallet 302 is conveyed by a conveyor 303 and stopped at a predetermined position by a clamp 317 which is driven by a cylinder-piston mechanism 318. A coil spring holder 306 is obliquely mounted on the pallet 302 and the coil spring 3 is set on the holder 306. The coil spring identifying mechanism 301 of this example comprises a loading-measuring head 308 which is movable obliquely up and down and back and forth. A pair of guide rails 311 are obliquely mounted on a frame 309 at an angle equal to the inclined angle of the holder 306 and the base portion 308a of the loading-measuring head 308 is supported so that the head 308 can be moved up and down along the guide rails 311. The base portion 308a is connected to the piston rod of a cylinder-piston mechanism 312 which is mounted on the frame 309. The loading-measuring head 308 has a pressing member 313 which is a cone in shape. The pressing member 313 is obliquely mounted at an angle equal to the inclined angle of the coil spring 3 held by the holder 306. A load cell 314 which measures the load or the counterforce is mounted on the pressing member 313. The output of the load cell 314 is input into a controller (not shown) which relates the measured values with the amounts of compressions of the coil spring 3. The controller controls also the cylinder-piston mechanism 312.

The frame 309 has a pair of legs 309a and the legs 309a are placed on a pair of guide rails 315. Thus, the frame 309 is supported to be movable toward and away from the coil spring 3 held by the holder 306. The frame 309 is driven by a cylinder-piston mechanism 316.

Since the coil spring 3 is obliquely supported, a component of the compressing force laterally acts when the coil spring 3 is compressed. In order to withstand the lateral component, a backup unit 320 is provided under the pallet 302. The backup unit 320 comprises a backing member 321 having a backing surface 321a perpendicular to the compressing direction of the coil spring 3, and a sliding member 322 which is slidable along the axis along which the compressing force acts on the coil spring 3. The sliding member 322 has an abutment surface 322a opposed to the backing surface 321a. The lower end face 322b of the sliding member 322 is inclined and slidingly rests on a tapered surface 323a of a tapered member 323. The tapered member 323 is slidable in the direction perpendicular to the sliding direction of the sliding member 322. That is, the distance between the backing surface 321a and the abutment surface 322a can be changed by sliding the tapered member 323. When the coil spring 3 is compressed, the tapered member 323 is slid so that the abutment surface 322a is brought into abutment against the backing surface 321a and supports the lateral component.

The operation of the coil spring identifying mechanism 301 will be described, hereinbelow.

When the pallet 302 carrying thereon the coil spring 3 is stopped at the predetermined position, the frame 309 is moved toward the pallet 302 so that the moving direction of the pressing member 313 of the loading-measuring head 308 is aligned with the central axis of the coil spring 3. Then the cylinder-piston mechanism 312 is operated so that the pressing member 313 abuts against the upper end of the coil spring 3 and compresses the coil spring 3 to a first amount. The load cell 314 measures the counterforce of the coil spring 3 at this time. The controller stores the measured value and the amount of compression. Then, the cylinder-piston mechanism 312 is operated again to compress the coil spring 3 to a second amount and the controller stores the measured value and the amount of compression. In this manner, the counterforce of the coil spring 3 for a plurality of amounts of compression are measured. The controller determines whether the coil spring 3 is a desired one on the basis of the measurements.

It is preferred that the counterforce of the coil spring 3 be measured for the amounts corresponding to the load acting on the coil spring 3 when it is actually incorporated into a vehicle and the maximum load acting on the coil spring 3 during running.

Since the counterforces for a given amount of compression of coil springs having different spring coefficients can be the same, the coil springs can be confused if they are identified on the basis of a single measurement. On the other, the coil spring identifying mechanism of this example can identify with a better accuracy.

We claim:

1. A vehicle suspension assembly system for assembling a suspension having a shock absorber and a coil spring comprising
a pallet which is conveyed by a conveyor line and is provided with a shock absorber holding mechanism which holds the shock absorber in an upstanding state, a compressing claw means which is engaged with an upper end portion of the coil spring which has been set on the shock absorber, and a feed mechanism which moves up and down the compressing claw means and holds it in a desired position,
said conveyor line being provided with a driving mechanism which drives the feed mechanism.

2. A vehicle suspension assembly system as defined in claim 1 in which said pallet is provided with a rod retainer mechanism which holds the rod of the shock absorber in an extended state.

3. A vehicle suspension assembly system as defined in claim 2 in which said conveyor line is provided with a rod lifting means which lifts the rod of the shock absorber in order to extend the rod.

4. A vehicle suspension assembly system as defined in claim 2 in which said conveyor line is provided with a releasing mechanism which causes the rod retainer mechanism to release the rod of the shock absorber.

5. A vehicle suspension assembly system as defined in claim 1 in which said feed mechanism comprises a lead screw mechanism.

6. A vehicle suspension assembly system as defined in claim 1 in which said compressing claw means comprises a pair of claws which are horizontally rotatable to open and close.

7. A vehicle suspension assembly system as defined in claim 1 in which said pallet is provided with a temporary support means on which at least one of a predetermined actuator casing and a set plate is temporarily placed.

8. A vehicle suspension assembly system as defined in claim 1 in which said pallet is provided with a temporary support means on which the coil spring is temporarily placed.

9. A vehicle suspension assembly system as defined in claim 1 in which said conveyor line is provided with a nut tightening means which tightens a nut on an upper end portion of the rod of the shock absorber.

10. A vehicle suspension assembly system as defined in claim 1 in which said shock absorber holding mechanism comprises a lower end support on which the lower end of the shock absorber rests and an intermediate support means which holds an intermediate portion of the shock absorber.

11. A vehicle suspension assembly system as defined in claim 1 further comprising a coil spring identifying mechanism which compresses the coil spring to a predetermined amount, measure the counterforce of the coil spring and determines whether the coil spring is a desired one based on a comparison between the measured counterforce and a predetermined amount of compression.

12. A vehicle suspension assembly system as defined in claim 11 in which said coil spring identifying mechanism compresses the coil spring to a plurality of predetermined amounts, measures the counterforces of the coil spring for the respective amounts of each of the compressions and determines whether the coil spring is a desired one on the basis of the comparison between the measured counterforces and the amounts of compression.

13. A vehicle suspension assembly system as defined in claim 12 in which said coil spring identifying mechanism measures the counterforces of the coil spring for the amounts corresponding to a load acting on the coil spring when it is actually incorporated into a vehicle and a maximum load acting on the coil spring during running.

* * * * *